(12) United States Patent
Sahraei et al.

(10) Patent No.: US 11,716,233 B2
(45) Date of Patent: Aug. 1, 2023

(54) PEAK REDUCTION TONE (PRT) SELECTION

(71) Applicant: QUALCOMM Incorporated, San Diego, CA (US)

(72) Inventors: Saeid Sahraei, San Diego, CA (US); Gokul Sridharan, Sunnyvale, CA (US); Peter Gaal, San Diego, CA (US); Krishna Kiran Mukkavilli, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/332,856

(22) Filed: May 27, 2021

(65) Prior Publication Data

US 2021/0377090 A1    Dec. 2, 2021

Related U.S. Application Data

(60) Provisional application No. 63/031,437, filed on May 28, 2020.

(51) Int. Cl.
*H04L 27/26*    (2006.01)
*H04L 1/00*    (2006.01)
*H04W 72/0446*    (2023.01)

(52) U.S. Cl.
CPC ........ *H04L 27/2614* (2013.01); *H04L 1/0071* (2013.01); *H04W 72/0446* (2013.01)

(58) Field of Classification Search
CPC ............... H04L 27/2614; H04L 1/0071; H04L 27/2662; H04L 27/2613; H04L 27/2624; H04L 27/2665; H04L 27/3411; H04L 5/0039; H04L 5/0048; H04W 72/0446
See application file for complete search history.

(56) References Cited

U.S. PATENT DOCUMENTS 7,961,591 B2    6/2011  Abedi
8,275,067 B2*   9/2012  Garg ................... H04M 11/062
                                                                      375/296

(Continued)

OTHER PUBLICATIONS

International Search Report and Written Opinion—PCT/US2021/034920—ISA/EPO—dated Sep. 13, 2021.

(Continued)

*Primary Examiner* — Chandrahas B Patel
(74) *Attorney, Agent, or Firm* — Loza & Loza, LLP

(57) ABSTRACT

Aspects of the disclosure relate to selection and use of peak reduction tones (PRTs) including obtaining a predetermined sequence of PRTs corresponding to a set of granted resources including a plurality of tones, mapping a set of data to a first subset of the plurality of tones outside of the predetermined sequence of PRTs and mapping a set of PRTs to a second subset of the plurality of tones within the predetermined sequence of PRTs. At least one peak of a time domain representation of the first subset of the plurality of tones is canceled using a time domain representation of the second subset of the plurality of tones. A transmitted waveform comprising the first subset of the plurality of tones and the second subset of the plurality of tones is transmitted.

26 Claims, 13 Drawing Sheets

(56) References Cited

U.S. PATENT DOCUMENTS 8,885,736 B2 * 11/2014 Garg .................... H04M 11/062
455/59
10,084,632 B2 * 9/2018 Agon .................. H04L 27/2623

OTHER PUBLICATIONS

Jian L.V., et al., "An Improved Tone Reservation Method for PAPR Reduction in OFDM Systems", Proceedings 2013 International Conference on Mechatronic Sciences, Electric Engineering and Computer (MEC), IEEE, Dec. 20, 2013 (Dec. 20, 2013), pp. 3791-3794, XP032634505, DOI: 10.1109/MEC.2013.6885651, ISBN: 978-1-4799-2564-3, [retrieved on Aug. 27, 2014], Section B, p. 3792, Left-Hand Column.

Yu P., et al., "A Low Complexity Tone Reservation Scheme Based on Time-Domain Kernel Matrix for PAPR Reduction in OFDM Systems", IEEE Transactions on Broadcasting, vol. 61, No. 4, Dec. 2015, pp. 710-716.

* cited by examiner

PEAK REDUCTION TONE (PRT) SELECTION

CROSS-REFERENCE TO RELATED APPLICATIONS

This application for patent claims priority to and the benefit of provisional patent application No. 63/031,437 entitled "Method and Apparatus for Selection of Peak Reduction Tones (PRTs) Based on Optimal Golomb Rulers" filed in the United States Patent and Trademark Office on May 28, 2020, the entire content of which is incorporated herein by reference as if fully set forth below in its entirety and for all applicable purposes.

TECHNICAL FIELD

The technology discussed below relates generally to wireless communication systems, and more particularly, to avoiding non-linearity in power amplifiers by selection of peak reduction tones (PRTs).

INTRODUCTION

Power amplifiers, including commercial power amplifiers, have a non-linear behavior if operated at input power levels at or greater than their 1 dB compression point levels. This non-linearity results in in-band and out-of-band distortion of an input signal and degraded error vector management (EVM) at the receiver. EVM is a measure of modulation accuracy, or how well a power amplifier is transmitting information, represented by varying phase and amplitude of a radio frequency (RF) signal. To avoid the non-linearity, a power amplifier may be operated at a mean input power level that is several dB lower than the saturation point of the power amplifier. Operation at the mean input power level may involve an input back off (IBO) of x dB in examples where an input signal has a peak-to-average power ratio (PAPR) of x dB to avoid non-linearity due to the peak of the input signal.

Orthogonal frequency-division multiplexed (OFDM) signals are known to suffer from significant PAPR that grows rapidly as the number of resource blocks increases. For example, 5G new radio (NR) may allow higher data rates than long term evolution (LTE). The higher data rates may result in an increased OFDM resource block size, thereby increasing the PAPR. Existing PAPR reduction techniques are data-dependent and computationally expensive, making them undesirable for real-time implementation. As a result, clipping and filtering (CF) is a common way to reduce PAPR in the industry. However, CF may result in in-band distortion and may not converge to a desirable solution.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication is disclosed. The method includes obtaining a predetermined sequence of peak reduction tones (PRTs) corresponding to a set of resources (e.g., a set of granted/assigned resources) comprised of a plurality of tones, mapping a set of data to a first subset of the plurality of tones outside of the predetermined sequence of PRTs, mapping a set of PRTs to a second subset of the plurality of tones within the predetermined sequence of PRTs, canceling at least one peak of a time domain representation of the first subset of the plurality of tones using a time domain representation of the second subset of the plurality of tones, and transmitting a transmitted waveform comprising the first subset of the plurality of tones and the second subset of the plurality of tones.

In another example, a wireless communication apparatus is disclosed. The wireless communication apparatus includes a wireless transceiver, a memory, and a processor coupled to the wireless transceiver and the memory. In one example the processor and the memory may be configured to obtain a predetermined sequence of peak reduction tones (PRTs) corresponding to a set of resources comprised of a plurality of tones, map a set of data to a first subset of the plurality of tones outside of the predetermined sequence of PRTs, map a set of PRTs to a second subset of the plurality of tones within the predetermined sequence of PRTs, cancel at least one peak of a time domain representation of the first subset of the plurality of tones using a time domain representation of the second subset of the plurality of tones, and transmit a transmitted waveform comprising the first subset of the plurality of tones and the second subset of the plurality of tones.

According to one aspect, a wireless communication apparatus may include means for obtaining a predetermined sequence of peak reduction tones (PRTs) corresponding to a set of resources comprised of a plurality of tones, means for mapping a set of data to a first subset of the plurality of tones outside of the predetermined sequence of PRTs, means for mapping a set of PRTs to a second subset of the plurality of tones within the predetermined sequence of PRTs, means for canceling at least one peak of a time domain representation of the first subset of the plurality of tones using a time domain representation of the second subset of the plurality of tones, and means for transmitting a transmitted waveform comprising the first subset of the plurality of tones and the second subset of the plurality of tones.

In still another example, an article of manufacture for use by a wireless communication apparatus in a wireless communication network is disclosed. In the example, the article of manufacture may include a non-transitory computer-readable medium having stored therein instructions executable by one or more processors of the wireless communication apparatus. The instructions executable by one or more processors of the wireless communication apparatus may include instructions to obtain a predetermined sequence of peak reduction tones (PRTs) corresponding to a set of resources comprised of a plurality of tones, map a set of data to a first subset of the plurality of tones outside of the predetermined sequence of PRTs, map a set of PRTs to a second subset of the plurality of tones within the predetermined sequence of PRTs, cancel at least one peak of a time domain representation of the first subset of the plurality of tones using a time domain representation of the second subset of the plurality of tones, and transmit a transmitted waveform comprising the first subset of the plurality of tones and the second subset of the plurality of tones.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. Similarly, while examples may be discussed below as device, system, or method examples, it should be understood that such examples can be implemented in various devices, systems, and methods.

DETAILED DESCRIPTION

Figure 1:
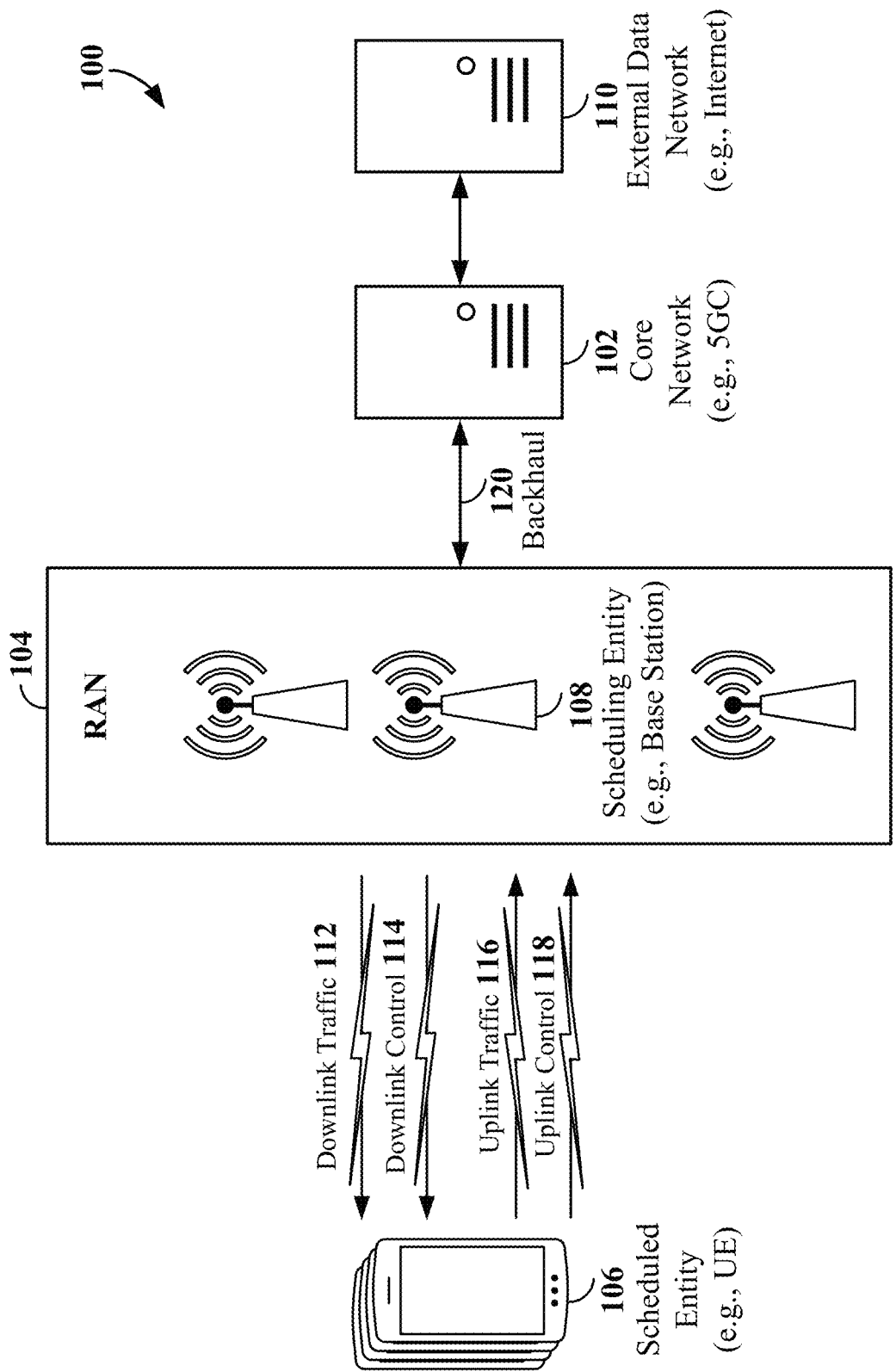
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

According to aspects described herein, peak reduction tone (PRT) techniques may be used to reduce a peak-to-average power ratio (PAPR) of transmitted signals. To reduce computational complexity, for example, a location of a sequence of PRTs may be determined and fixed in advance of a time when PRT techniques are implemented. If fixed in advance, a receiver will know which tones, of a plurality of received tones transmitted from a transmitter, are PRTs and which tones are data. The receiver may then decode only the data tones. By fixing in advance the PRT sequences, resources may be saved as a transmitter may not need to inform the receiver of the location of the PRTs used by the transmitter.

In addition, when the locations of the PRTs of a PRT sequence are fixed in advance, a transmitter may perform a non-computationally complex optimization of the phase and magnitude of the tones in the PRT sequence to minimize the PAPR of a transmitted signal. Furthermore, fixing the PRT sequence in advance, and pre-configuring the transmitter and receiver to be aware of a specific PRT sequence used for a given set of resources, may reduce the overall computational complexity of using PRT techniques to reduce the PAPR of a transmitted signal. For ease of reference, a set of resources, whether assigned or granted, will be interchangeably referred to throughout as either a set of resources or a set of granted resources.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
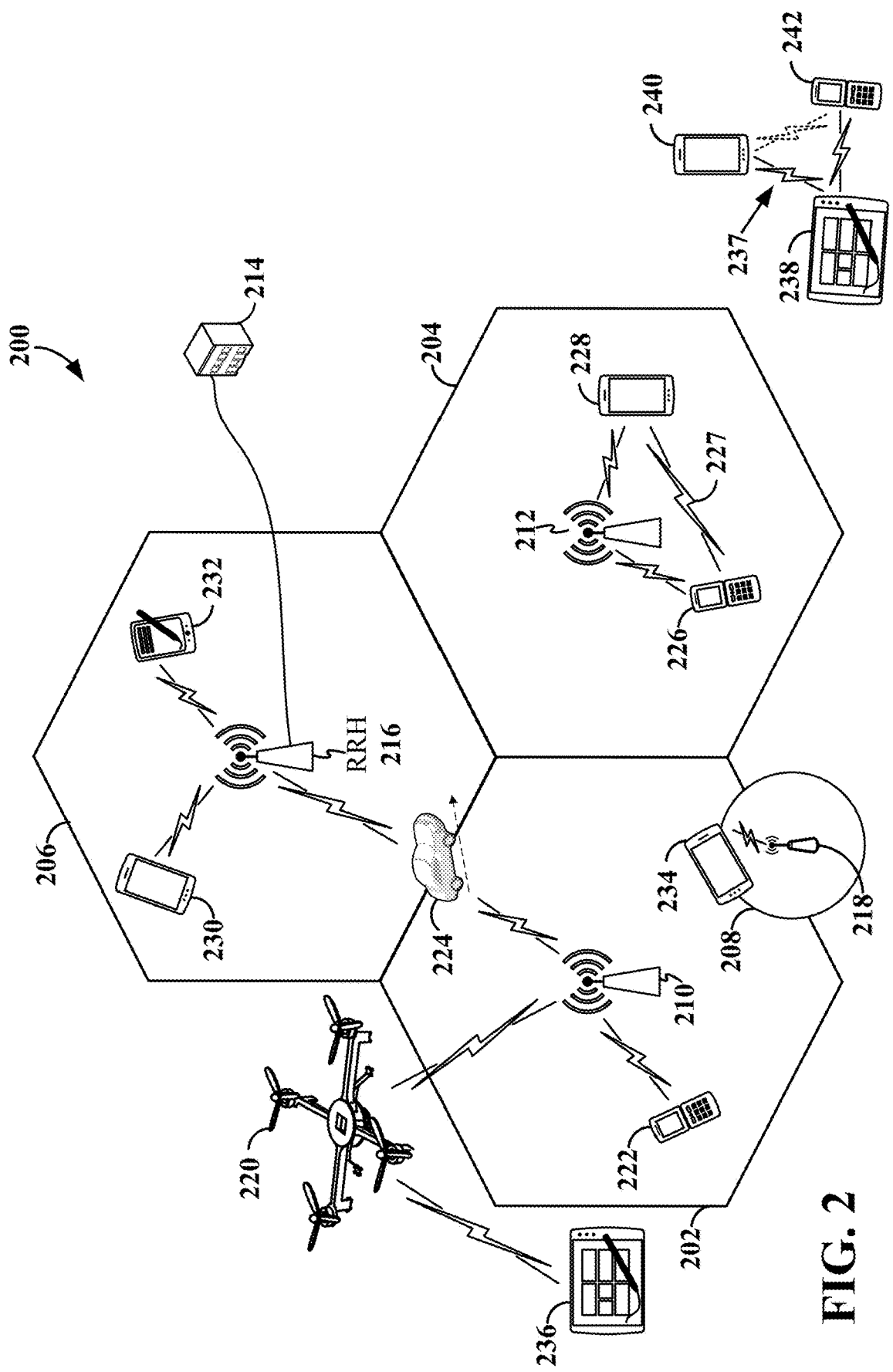
FIG. 2 is a schematic illustration of an example of a radio access network (RAN) according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station.

A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station.

In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 3:
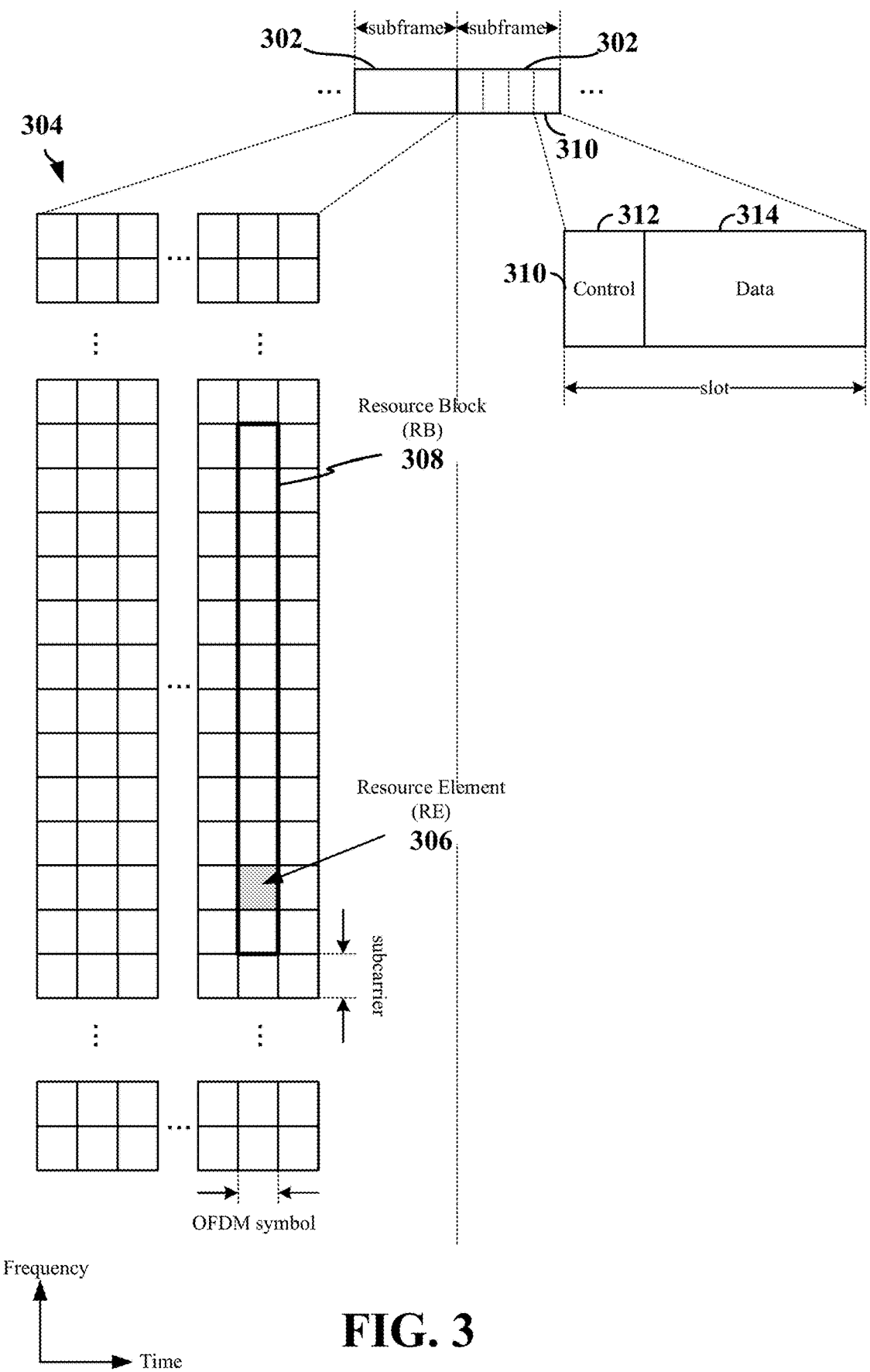
FIG. 3 is an expanded view of an exemplary subframe, showing an orthogonal frequency divisional multiplexing (OFDM) resource grid according to some aspects of the disclosure.

Referring now to FIG. 3, an expanded view of an exemplary subframe 302 is illustrated, showing an OFDM resource grid according to some aspects of the disclosure.

However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarrier of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the transmission and reception scheme utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIGS. 1, 2, and 3 are not necessarily all of the channels or carriers that may be utilized between devices, and those of ordinary skill in the art will recognize that other channels or carriers may be utilized in addition to those illustrated, such as other traffic, control, and feedback channels.

Long term evolution (LTE) and 5G new radio (5G NR) provide greater bandwidth, both in the uplink and downlink, compared to previous generations of cellular networks. In 5G NR networks, the increased bandwidth is attributable to both the addition of FR2, as well as increasing the available channel bandwidth to 100 MHz in FRE The preceding recitation of a network and frequency ranges are provided for illustrative and non-limiting purposes. Aspects described herein may be appliable to other networks and other frequency ranges, and the present application is not limited to any particular network configuration or frequency range.

The additional bandwidth available in 5G NR may be partially exploited by using longer orthogonal frequency-division multiplexed (OFDM) symbols. However, longer OFDM symbols may detrimentally increase the peak-to-average power (PAPR) for a given OFDM transmitted signal. Clipping and filtering (CF) is a common way to reduce PAPR in the industry. However, CF may result in in-band distortion and may not converge to a desirable solution. In various aspects of the disclosure, the PAPR increase resulting from the use of longer OFDM symbols may be offset by a PAPR reduction technique that may be referred to herein as tone reservation. As used herein, a single tone may correspond to a single subcarrier and the terms tone and subcarrier may be used interchangeably.

An OFDM signal may be transmitted on a set of resources. The set of resources includes a plurality of tones. A base station may reserve one set of resources for a downlink transmission and may transmit an assignment of the set of resources to a UE in downlink control information (DCI). The base station may grant another set of resources to the UE to use for an uplink transmission. The CF and tone reservation techniques exemplified herein may be applicable to both downlink and uplink transmission. For ease of reference, the set of resources used for transmission, whether assigned or granted, will be interchangeably referred to throughout as a set of resources, a set of resources having a plurality of tones, or a set of granted resources having a plurality of tones.

The tone reservation techniques exemplified herein may allow a transmitter to transmit a desired OFDM signal on a first subset of a plurality of tones in a set of resources. The first subset of the plurality of tones may be referred to as data tones irrespective of whether the first subset of the plurality of tones carries control or traffic. The tone reservation techniques exemplified herein may allow the transmitter to simultaneously transmit peak reduction tones (PRTs) on a second subset of the plurality of tones in the set of resources. The second subset of the plurality of tones may be reserved for the purpose of PAPR reduction. The second subset of the plurality of tones is different from the first subset of the plurality of tones. The second subset of the plurality of tones may be referred to as idle tones or PRTs. The second subset of the plurality of tones may be tones that are not used for communication (i.e., they do not carry data per se). To minimize the PAPR of an overall signal (i.e., of the plurality of tones in the set of resources. or of the combination of the first subset and the second subset of the plurality of tones), the magnitude and phase of each PRT may be optimized for a given OFDM symbol.

A transmitter and receiver may each be configured to be aware of which tones are data tones (i.e., the first subset of the plurality of tones) and which tones are PRTs (i.e., the second subset of the plurality of tones). Given that there may be no overlap between the data tones and PRTs, the tone reservation techniques (using PRTs) described herein may not degrade error vector management (EVM) at a receiver and may not adversely impact adjacent channel leakage ratio (ACLR). EVM is a measure of modulation accuracy, or how well a power amplifier is transmitting information. ACLR is a ratio of the filtered mean power centered on the assigned channel frequency to the filtered mean power centered on an adjacent channel frequency. Degradation of EVM and adverse impact to ACLR may be avoided at least because the receiver (knowing which tones are PRTs) may ignore the PRTs and only decode the data tones.

Figure 4A:
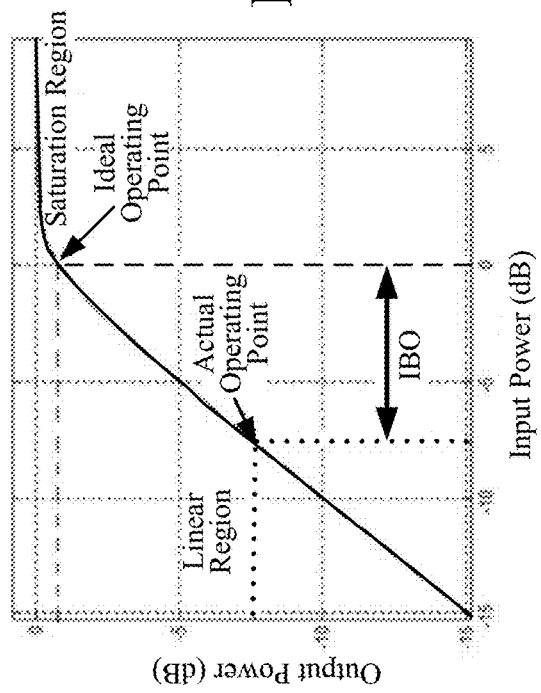
FIG. 4A is a diagram illustrating an example AM-to-AM conversion curve for a solid state power amplifier according to some aspects of the disclosure.

FIG. 4A is a diagram illustrating an example amplitude modulation (AM)-to-AM conversion curve for a solid state power amplifier (SSPA) model with p=2 (where p is a parameter used to control the AM/AM sharpness of the saturation region) according to some aspects of the disclosure. In FIG. 4, input power in dB is shown on the horizontal axis, and output power in dB is shown on the vertical axis. The gain of the SSPA may be accounted for by adding the gain to the output power. For example, for an SSPA with a gain of 5 dB, the range of 0 to −15 dB on the vertical axis would shift upward by 5 dB to a range of 5 to −10 dB.

In FIG. 4A, the linear region, which is the region in which there is a one-to-one correspondence between increases in input power and output power, extends from about −15 dB to about −2 dB. Between the input of −2 dB to 0 dB, the SSPA begins to enter the saturation region. By the time the input is at about 1 dB, the SSPA is fully saturated (corresponding to a normalized output of 0 dB). Further increases in input power of a signal at a desired frequency produce no increase in output power at the desired frequency. In the example of FIG. 4A, the operating point is identified as the −1 dB point, which is the point where the gain adjusted output power is 1 dB less than the input power. For example, for an input of −5 dB, the output corresponds to −5 dB (i.e., the output linearly follows the input), while for an input of 0 dB, the output corresponds to −1 dB (i.e., the output is compressed by 1 dB). Using the example of an SSPA with a gain of 5 dB, the preceding example indicates that for an input of −5 dBm, the output corresponds to 0 dBm, while for an input of 0 dBm, the output corresponds to −4 dBm (i.e., 1 dB less than the output power had the SSPA still been operating in the linear region).

An input back-off (IBO), which may be used to avoid non-linearity due to the peak-to-average power ratio (PAPR) of the input signal, is depicted in the example of FIG. 4A. The IBO is depicted as being about −7.5 dB. With an IBO of −7.5 dB, the actual operating point (e.g., the point corresponding to an average input power) of the SSPA is maintained in the linear region, and excursions of output power due to the PAPR allow the output power to increase by about 6.5 dB (not the full 7.5 dB of the IBO because the IBO corresponds to the −1 dB output power point).

Figure 4D:
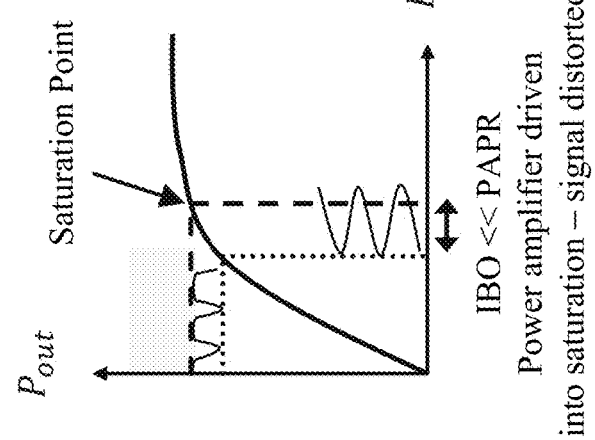
FIGS. 4B, 4C, and 4D are representations of the graph of FIG. 4A according to some aspects of the disclosure.
Figure 4C:
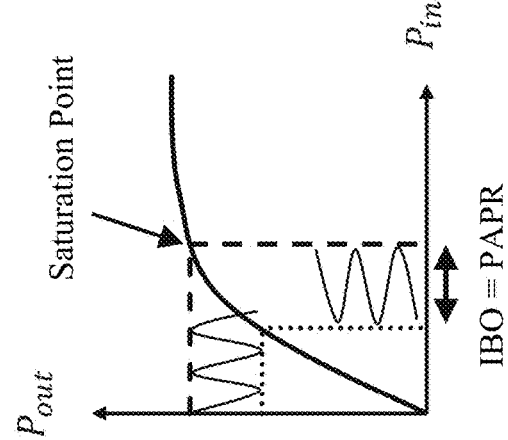
Figure 4B:
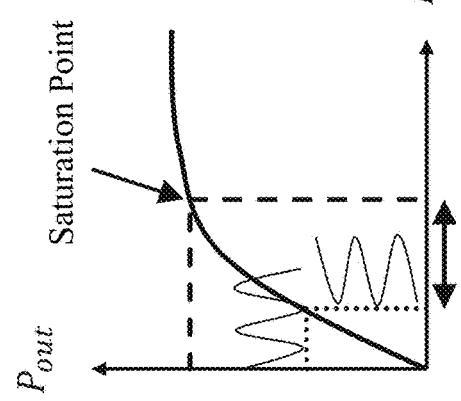

FIGS. 4B, 4C, and 4D are representations of the graph of FIG. 4A according to some aspects of the disclosure. In FIGS. 4B, 4C, and 4D, input power ($P_{in}$) in dB is shown on the horizontal axis and output power ($P_{out}$) in dB is shown on the vertical axis. The point identified as the saturation point in FIGS. 4B, 4C, and 4D may correspond to the ideal operating point in FIG. 4A, which corresponds to the −1 dB point in the example of FIG. 4A.

In the example of FIG. 4B, the IBO is much greater than the PAPR. This allows the peak excursions of the SSPA to remain in the linear region. For example, as illustrated, the peak-to-peak amplitude difference of the input signal is equal to the peak-to-peak amplitude difference of the output signal. However, this is an inefficient use of the power amplifier as much of the power amplifier's headroom is wasted.

In the example of FIG. 4C, the IBO is equal to the PAPR. This allows the peak excursions of the SSPA not to be compressed (or to only be compressed by about 1 dB given the example of FIG. 4A). For example, as illustrated, the peak-to-peak amplitude difference of the input signal is equal to the peak-to-peak amplitude difference of the output signal. Additionally, because the IBO is equal to the PAPR, the headroom of the power amplifier is used efficiently.

In the example of FIG. 4D, the IBO is much less than the PAPR. In this case, the peak excursions of the input signal are compressed, and the SSPA is being driven into saturation during the peak excursions. This saturation condition is illustrated in FIG. 4D, where the peaks of the input signal correspond to compressed peaks in the output signal.

Reducing the PAPR of a signal, such as a 5G NR OFDM signal, permits the IBO of an SSPA in a transmit chain of a 5G NR transmitter (e.g., a transmitter of a gNB or a 5G NR UE) to have a value that allows for non-compressed use of the SSPA's headroom.

To achieve PAPR reduction in a transmitted OFDM signal, the amplitude and the phase of the PRTs may be adjusted for each OFDM symbol. In addition, the location of the PRTs (e.g., identified by subcarrier index numbers, also referred to as tone index numbers or PRT indices) may be configured to transmitters and receivers in advance of their use of tone reservation techniques (using PRTs). For example, the locations of PRTs may be specified for and configured to each transmitter and receiver in a 5G NR system. Additionally, to reduce computational complexity, instead of adjusting the magnitude and phase of each PRT in real-time, universal tone index numbers for PRTs may be employed according to aspects described herein.

Figure 5:
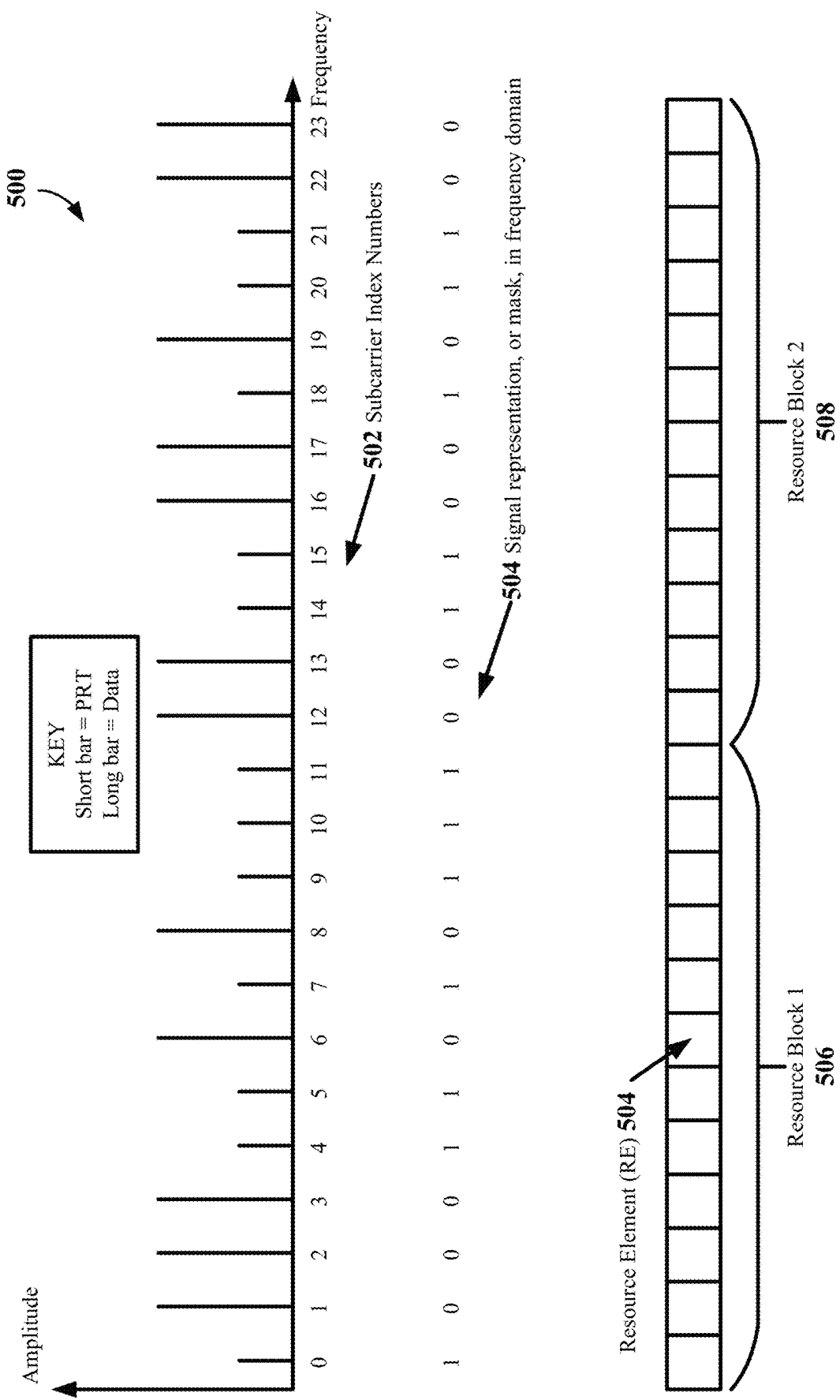
FIG. 5 is a plot of data tones and peak reduction tones in the frequency domain according to some aspects of the disclosure.

FIG. 5 is a plot of data tones and PRTs in the frequency domain according to some aspects of the disclosure. As used herein, the term "data" encompasses both traffic (e.g., downlink traffic 112, uplink traffic 116 of FIG. 1) and control (e.g., downlink control 114, uplink control 118 of FIG. 1). According to aspects herein, a plurality of PRTs in a set of resources may be fixed by specifications or may be otherwise predetermined such that a transmitter and a receiver are aware of which tones in the set of resources are configured for data and which tones in the set of resources are configured for PRTs.

In FIG. 5, frequency is represented along the horizontal axis and amplitude is represented along the vertical axis. In the example of FIG. 5, there are 24 tones, each corresponding to a respective subcarrier index number 502. In the example of FIG. 5, the 24 subcarrier index numbers 502 range from subcarrier index number 0 to subcarrier index number 23. A signal representation, or mask, in the frequency domain 504, with binary 1 indicating a subcarrier used for a PRT and binary 0 indicating a subcarrier used for data, is illustrated. Each tone corresponds to a frequency component of one resource element (RE) 504. For a signal representation or mask in accordance with 5G NR, one resource block (RB) is one RE wide (e.g., one symbol) by 12 subcarriers. Accordingly, the series of tones 500 of FIG. 5 corresponds to two RBs (resource block 1506 and resource block 2508).

The example of FIG. 5 is provided for illustrative purposes and is non-limiting. The illustrated amplitudes of the tones and their relative differences are for ease of graphic representation. The phase of each tone is not represented to avoid cluttering the drawing. Varying amplitudes and phases and varying relative differences between amplitudes and phases are within the scope of this disclosure. In the example shown in FIG. 5, a wireless communication apparatus (e.g., a scheduling entity or a scheduled entity) may utilize two contiguous RBs including 24 contiguous tones for a transmission; however, the use of two non-contiguous RBs, or combinations of various interlaced resource elements including non-contiguous or partially contiguous tones for transmissions are within the scope of the disclosure. Furthermore, applications of the tone reservation techniques (using PRTs) described herein are not limited to 24 tones ranging from subcarrier index number 0 to subcarrier index number 23. As known to those of skill in the art, for a 100 MHz bandwidth, there are 3264 available tones. The aspects described herein may be configured to a subset of the 3264 available tones or even all 3264 available tones.

In the examples described herein, the term "transmitter" may refer to a scheduling entity (e.g., a base station, a gNB) that transmits a downlink to a receiving scheduled entity (e.g., a UE) or may refer to a scheduled entity (e.g., a UE) that transmits an uplink to a receiving scheduling entity (e.g., a gNB). Depending on the context, the term "transmitter" may refer to a transmitter circuit of a given apparatus (e.g., a scheduling or scheduled entity) or refer to the given apparatus itself. Likewise, depending on the context, the term "receiver" may refer to a receiver circuit of a given apparatus (e.g., a scheduling or scheduled entity) or the apparatus itself.

According to some aspects, a sequence of tones in a given set of resources (e.g., a set of granted resources having a plurality of tones) may be preassigned as a PRT sequence. In some examples, the tones of the PRT sequence may not be used for data. However, according to some aspects, a transmitter may inform a receiver that the transmitter is, or is not, using tone reservation techniques (using PRTs) such as those described herein. The receiver may be informed about whether the transmitter is, or is not, using tone reservation techniques (using PRTs) based, for example, on one bit conveyed in user plane data or control plane signaling. If the transmitter is not using tone reservation techniques (e.g., signified by the one bit representing "false"), then a given preassigned sequence of tones is not used as PRTs and may instead be used for data. In other words, if the transmitter is not using tone reservation techniques (e.g., signified by the one bit representing "false"), then all tones in a given set of resources may be used for data and all tones may be decoded. If the transmitter is using tone reservation techniques (e.g., signified by the one bit representing "true"), then only a first subset of the plurality of tones of the set of resources may be used for data and is intended to be decoded, while a second subset of the plurality of tones of the set of resources, different from the first subset of the plurality of tones, may be used for PRTs and may be ignored (e.g., may not be decoded) by the receiver.

The transmitter may base a decision to use tone reservation techniques (using PRTs) on, for example, the availability of resources. For example, if a transmitter has a large amount of data in a buffer that is awaiting transmission, the transmitter may determine not to use the tone reservation techniques and instead, use all available resources for the transmission of the buffered data. The transmitter may base a decision to use, or not use, tone reservation techniques on other aspects or considerations, such as quality of service (QoS) or latency associated with data awaiting transmission stored in the buffer of the transmitter. Other factors on which a transmitter may base a decision to use, or not use, tone reservation techniques are within the scope of the disclosure.

A subset (e.g., the second subset) of the plurality of tones in a set of resources may be pre-assigned as PRTs. The pre-assignment may be, for example, fixed by specifications and configured on both scheduling entities (e.g., base stations, gNBs) and scheduled entities (e.g., UEs). In some examples, both a scheduling entity and a scheduled entity may be pre-configured with tone identifiers (IDs) (e.g., subcarrier index numbers 502) of each of the tones in any given set of tones that are reserved as PRTs. In other examples, if a scheduling entity and a scheduled entity are not aware of a pre-assignment of PRTs or have not been pre-configured as to the location of the PRTs, then a scheduling entity may make the scheduled entity aware of the selection through, for example, signaling.

In the example of FIG. 5, the short bars, represented by subcarrier index numbers 0, 4, 5, 7, 9, 10, 11, 14, 15, 18, 20, and 21 are selected as PRTs (e.g., the second subset). The long bars, represented by subcarrier index numbers 1, 2, 3, 6, 8, 12, 13, 16, 17, 19, 22, and 23 represent data tones (e.g., the first subset of the plurality of tones). Together, the 24 subcarriers may correspond to one OFDM signal that includes 24 tones.

To transform from the frequency domain of FIG. 5 to the time domain, the UE may take an inverse fast Fourier transform (IFFT) of the OFDM signal of FIG. 5.

In addition, a signal-to-clipping noise-ratio-tone reservation (SCR-TR) technique may be used to optimize the amplitude and phase of the PRTs (e.g., the second subset of the plurality of tones) when given the location of the reserved tones (e.g., when the index numbers of the PRTs are known).

According to aspects described herein, a set of resources may be expressed as a set $\{1, \ldots, N\}$ (in the example of FIG. 5 $\{0, \ldots, 23\}$) of tones. Let $\Phi$ be a subset of the set $\{1, \ldots, N\}$ corresponding to the locations of the PRTs (in the example of FIG. 5, $=\{0, 4, 5, 7, 9, 10, 11, 14, 15, 18, 20, 21\}$). The subset $\Phi$ may be referred to as the second subset herein. The remaining subset of tones $\{1, 2, 3, 6, 8, 12, 13, 16, 17, 19, 22,$ and $23\}$ may be used for data tones and may be referred to as the first subset herein. The first subset of tones may be identified as $\{1, \ldots, N\}\backslash \Phi$, where the "\" in the formula A\B is known as a relative complement, and the formula in the form of A\B indicates "the objects that belong to A and not to B." Therefore, $\{1, \ldots, N\}\backslash \Phi = \{1, 2, 3, 4, 6, 8, 12, 13, 16, 17, 19, 22, 23\}$ in the example of FIG. 5.

According to SCR-TR, a frequency domain kernel, $P_1$, may be constructed, where:

$$P_i = \begin{cases} 1 & \text{if } i \in \Phi \\ 0 & \text{if } i \in [N]\backslash\Phi \end{cases} \quad (1)$$

where i is an index number of a tone (e.g., i=subcarrier index number) and [N] represents $\{1, \ldots, N\}$. Therefore, the formula in the form of $i \in \Phi$ indicates "i is an element of $\Phi$" and the formula in the form of $i \in [N] \backslash \Phi$ indicates "i is not an element of $\Phi$."

Next, a time domain representation, p, of the frequency domain kernel, P, is obtained by taking the inverse fast Fourier transform of P, where:

$$p = \text{ifft}(P) \quad (2)$$

Next, let X be the frequency domain data that is represented in the illustration of FIG. 5 by long vertical bars (i.e., the subcarriers corresponding to the first subset of the plurality of tones). It may be observed that $X_i = 0$, if $i \in \Phi$. In other words, the data of the ith value of X ($X_i$) is equal to 0 if i is an element of $\Phi$ (i.e., if i is an element of the set of subcarrier index numbers allotted to the second subset of the plurality of tones). According to SCR-TR, a frequency domain kernel, $X_1$, may be constructed, where:

$$X_i = \begin{cases} 1 & \text{if } i \in \Phi \\ 0 & \text{if } i \in [N] \backslash \Phi \end{cases} \quad (3)$$

Next, a time domain representation, x, of the frequency domain kernel, X, is obtained by taking the inverse fast Fourier transform of X, where:

$$x = \text{ifft}(X) \quad (4)$$

Two observations may be made with respect to the SCR-TR algorithm for tone reservation. First, the time domain kernel p looks like a delta function with negligible side-lobes if the number of reserved tones is sufficiently large and the locations are appropriately chosen. For example, the time domain kernel p may be represented by a single prominent main lobe peak and sidelobes with relatively much less amplitude than the main lobe. The waveform p 606 of FIG. 6 (i.e., the waveform represented in dashed-line form) exemplifies these characteristics. Second, circularly shifting p in the time domain does not impact the location of reserved tones in the frequency domain, but rather disturbs their phase. The indices corresponding to the value 0 in Equation 1 (which correspond to the data tones) may not be changed by the process of shifting p in the time domain. Therefore, in the frequency domain, the desired signal X is unchanged by the PRT technique described herein.

Thus, the SCR-TR algorithm for tone reservation may include the following four steps:
1. Find the location of the largest peak of x. Let $j \in \{1, \ldots, N\}$ be the index, where N is an integer.
2. Circularly shift p so that the peaks are aligned. For example, $p_j = \text{circshift}(p, j)$, where circshift $(p, j)$ is the circular shift of p by j units to the right. The value of j may be incremented to produce the circular shift of the original waveform p. For example, in FIG. 6, if the presently used index j is 3, then p 606 would be the original waveform shifted to the right by 3 units.
3. Subtract a scaled and shifted p from x to obtain $$x_{new} = x - \frac{|x(j)| - \mu}{p(0)} p_j e^{i \angle x(j)},$$

where $\mu$ is the target peak, $\angle x(j)$ is the phase of x(j), $i = \sqrt{-1}$, the scaling term is $$\frac{|x(j)| - \mu}{p(0)}$$

and the scaling term may be changed for each peak, and $e^{i \angle x(j)}$ represents the phase shift of $p_j$ and the phase shift may be changed for each peak
4. Iterate several times to reduce several peaks.

Figure 6:
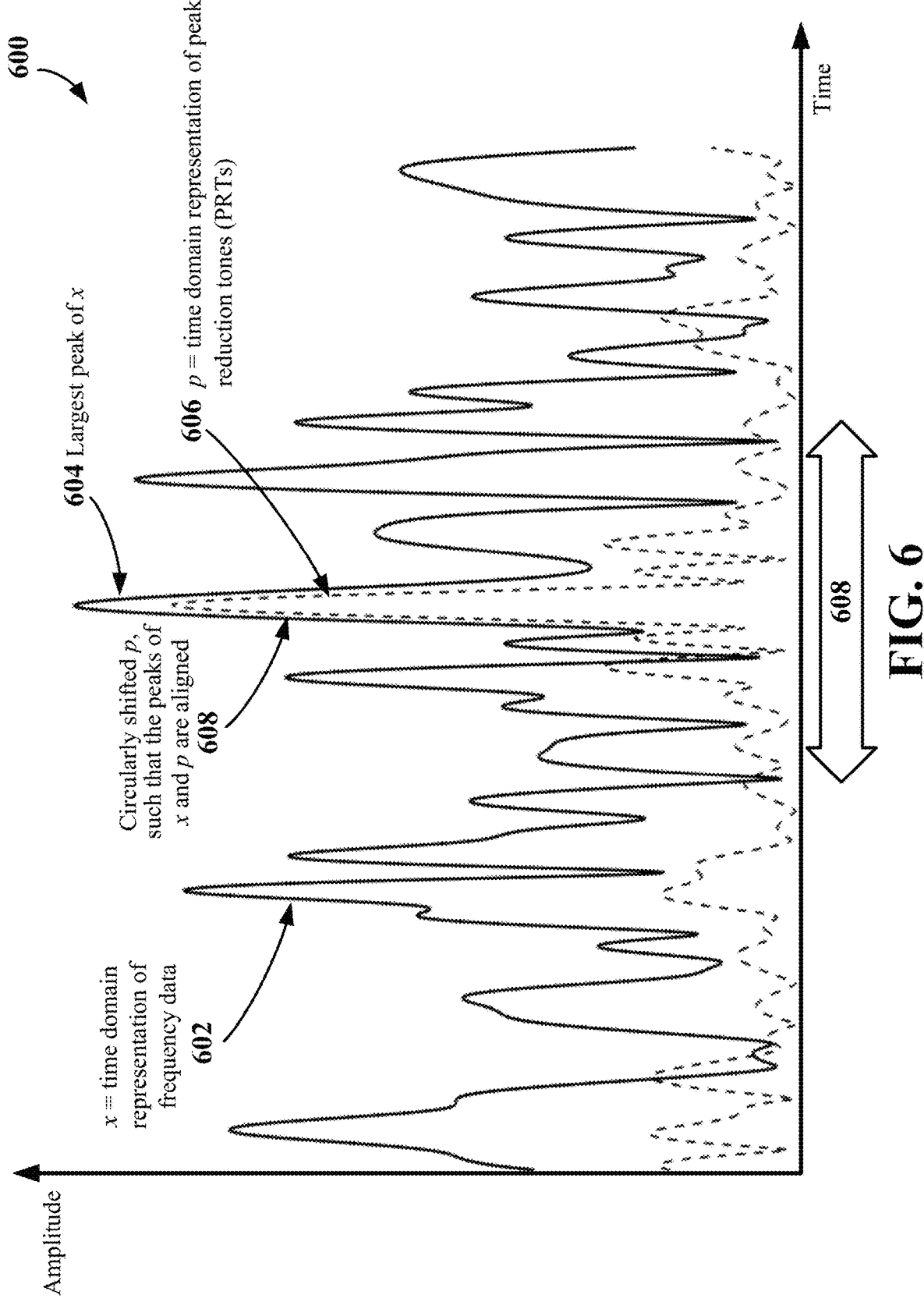
FIG. 6 is a plot of data tones and peak reduction tones in the time domain according to some aspects of the disclosure.

FIG. 6 is a plot 600 of a data tones 602 and PRTs 606 in the time domain according to some aspects of the disclosure. The plot 600 may be used to explain steps 1 and 2 of the above-described SCR-TR algorithm for tone reservation, for example. In FIG. 6, time is represented along the horizontal axis and amplitude is represented along the vertical axis. The multi-peaked waveform corresponds to x 602 (shown in solid line), which is the time domain representation of the frequency data (i.e., the first subset of the plurality of tones). The largest peak 604 of x 602 appears in the middle of the illustration. The largest peak 604 may be referred to as a target peak. The singularly peaked waveform corresponds to p 606 (shown in dashed line), which is the time domain representation of the peak reduction tones (PRTs) (i.e., the second subset of the plurality of tones). In the illustration of FIG. 6, p 606 has been circularly shifted (e.g., moved from left-to-right or right-to-left) and scaled in amplitude so that the largest peak 604 of x 602 (e.g., the target peak of x) and the peak of p 606 are aligned. The circular shift may be graphically represented by the double-headed arrow 608. In the next step, step 3, the scaled and shifted p is subtracted from x to obtain a new x, referred to as $x_{new}$, and steps 1-3 are repeated to reduce the peaks of $x_{new}$. In this manner, the PAPR of x may be reduced.

Figure 7A:
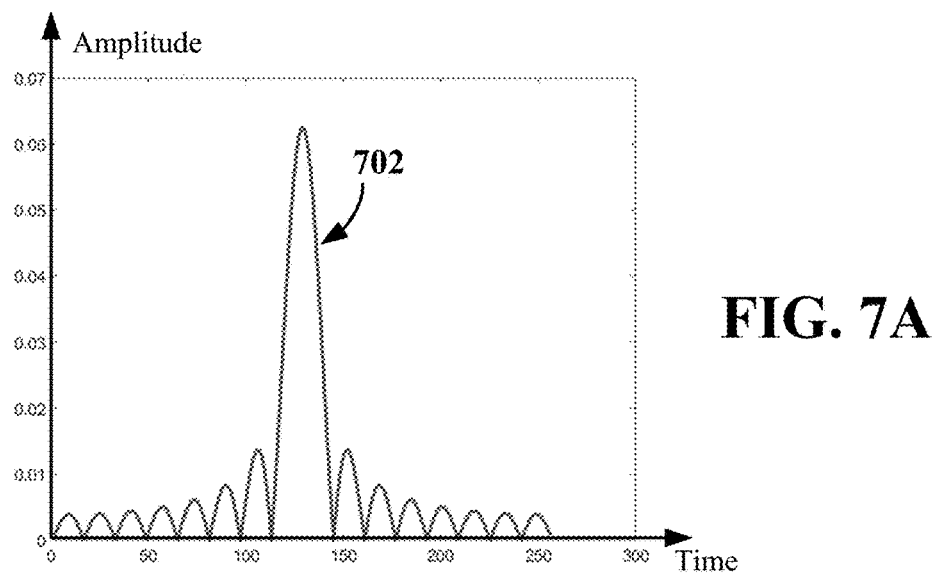
FIGS. 7A, 7B, and 7C are diagrams illustrating example time domain representations of various inverse fast Fourier transforms (IFFTs) of respective sets of reserved tones according to some aspects of the disclosure.
Figure 7B:
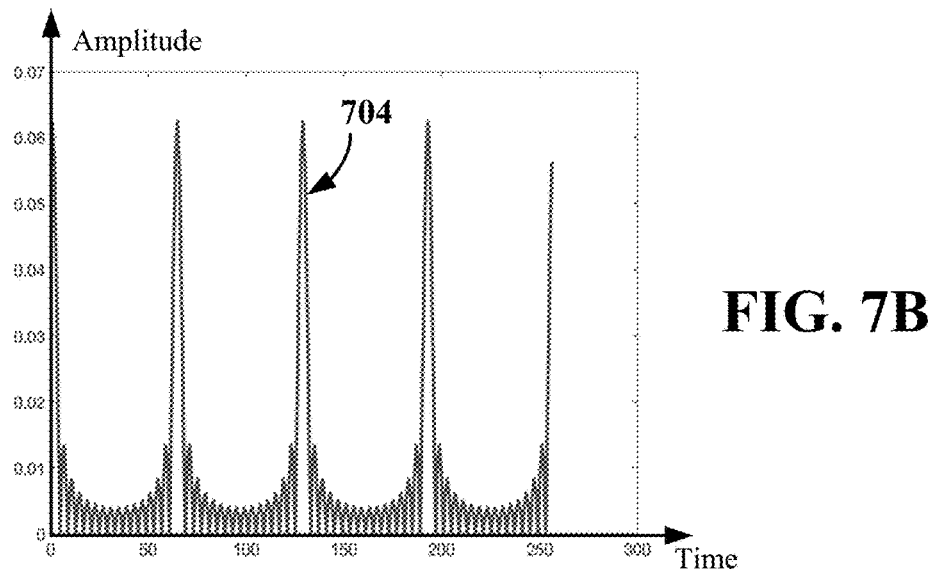
Figure 7C:
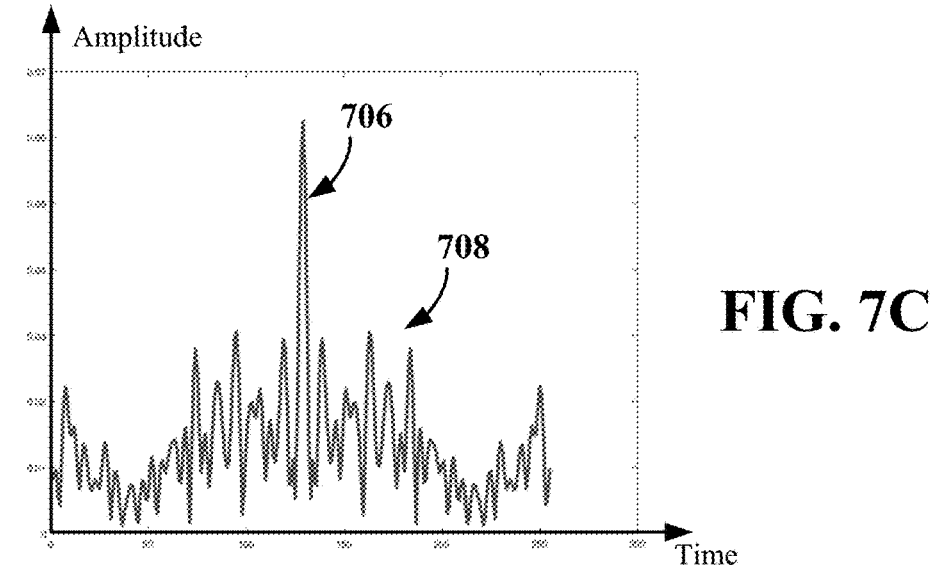

FIGS. 7A, 7B, and 7C are diagrams illustrating example time domain representations of various inverse fast Fourier transforms (IFFTs) of respective sets of reserved tones according to some aspects of the disclosure. In FIGS. 7A, 7B, and 7C, time is represented on the horizontal axis while amplitude is represented on the vertical axis. In FIG. 7A, a single relatively wide lobe 702 is produced from an IFFT of a set of contiguous tones in the frequency domain. In comparison to the time domain kernel p of FIG. 6, the single relatively wide lobe 702 of FIG. 7A may be inferior for the purposes of the SCR-TR algorithm described above. In FIG. 7B, a uniform comb 704 in the time domain is produced. In comparison to the time domain kernel p of FIG. 6, the width of a primary lobe (in the center of the image) is narrow; however, the side lobes (i.e., the high peak signals to the left and right of the center lobe) have amplitudes that are substantially similar to that of the main lobe. This plurality of equally spaced lobes may make this waveform unsuitable for step 3 of the SCR-TR algorithm. In FIG. 7C, a single narrow main lobe 706 in the time domain is flanked on either side by smaller sidelobes 708. The waveform of FIG. 7C may be produced by taking an IFFT of a random set of subcarriers in the frequency domain. FIG. 7C may represent a reasonable trade-off between the wide main lobe of FIG. 7A and the comb of narrow lobes in FIG. 7B.

A perfect kernel may be desirable to implement the PRT techniques described herein. For example, for a sequence $A_0, \ldots, A_{n-1}$, with $A_i \in \{0,1\}$, one can define a modular autocorrelation as:

$$B_j = \sum_{i=0}^{n-1} A_i A_{\text{mod}(i+j,n)}, \text{ for } j = 0, \ldots, n-1 \quad (5)$$

The modular autocorrelation may be considered perfect if $B_j$=constant, for $j \neq 0$.

A sequence $A_0, \ldots, A_{n-1}$ (in the frequency domain) with perfect autocorrelation, generates a perfect kernel, a, where a=ifft(A). For the perfect kernel:

$$B_j = \begin{cases} c, \text{ for } j = 0 \\ d, \text{ for } j \neq 0 \end{cases} \leftrightarrow [ifft(B)]_j = b = \begin{cases} c + d*(n-1), \text{ for } j = 0 \\ c - d, \text{ for } j \neq 0 \end{cases} \quad (6)$$

$$|a| = |ifft(A)| = \sqrt{|ifft(B)|} \quad (7)$$

Figure 8:
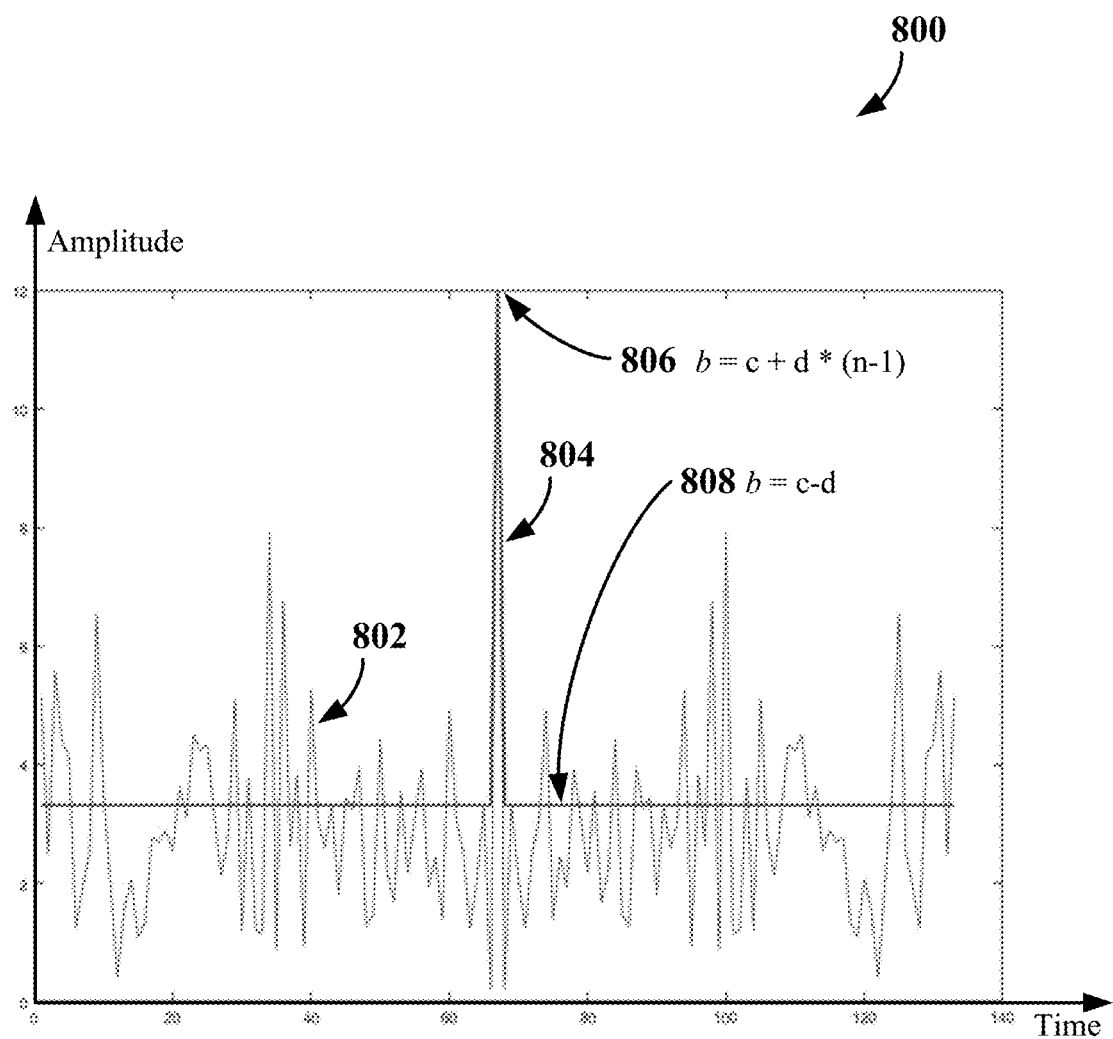
FIG. 8 depicts an imperfect kernel and a perfect kernel according to some aspects of the disclosure.

FIG. 8 depicts an imperfect kernel 802 and a perfect kernel 804 according to some aspects of the disclosure. For the perfect kernel 804, in the time domain of FIG. 8, b=c+d*(n-1) 806 for the main lobe (j=0) and b=c-d everywhere else (j≠0). Accordingly, b is referred to as a perfect kernel.

To find which sequences generate perfect autocorrelation, one may consider a sequence $A_0, \ldots, A_{n-1}$ with $A_i \in OM$. Let $S \subseteq \{0, \ldots, n-1\}$ represent the non-zero indices of a. The nomenclature $S \subseteq \{0, \ldots, n-1\}$ means that S is a subset of the set $\{0, \ldots, n-1\}$. The autocorrelation can be alternatively given as:

$$B_j = \sum_{i=0}^{n-1} 1_{\{\{i, mod(i+j,n)\} \subseteq S\}} \text{ for } j=0, \ldots, n-1 \quad (8)$$

or $$B_j = \sum_{\{i,k\} \subseteq S} 1_{\{mod(k-i,n)=j\}} \text{ for } j=0, \ldots, n-1 \quad (9)$$

where $1_p$ corresponds to an indicator function defined on a logical statement p having the value of 1 when p is a true statement and having the value 0 when p is a false statement.

For a given series $A_0, \ldots, A_{n-1}$ with a corresponding set S, the autocorrelation B is perfect if every $j \in \{1, \ldots, n-1\}$ can be written in exactly ways as a difference of elements of S, where $\lambda$ is independent of j.

Such a set S may be referred to herein as a "difference set" with repetition $\lambda$. According to some aspects, the number of peak reduction tones squared may be approximately equal to the total number of tones multiplied by 2, as mathematically expressed below:

$$\text{numPRT}^2 \cong \text{numTones} \times \lambda \quad (10)$$

A perfect ruler is a set of integers $S \subseteq \{0, \ldots, n-1\}$ constructed such that the pairwise differences of the elements of S modulus n form a closed interval of integers. A perfect ruler corresponds to a difference set with $\lambda=1$ (each difference is repeated only once).

By way of example, using S as PRT indices results in a perfect kernel. For instance, consider:

$$S=\{0,1,5\} \subseteq \{0,1,\ldots,6\} \quad (11)$$

The difference set (e.g., the pairwise differences between the pairs 0 and 1, 1 and 5, and 5 and 0) of S is given by:

$$\{1-0, 5-0, 0-1, 0-5, 1-5, 5-1\} \mod 7 \quad (12)$$

which is equal to $\{1,5,6,2,3,4\}$ \quad (13)

A determination may be made as to whether the set S is a difference set based on the set given in Equation 13. For example, the set given in Equation 13 may be sorted to determine if that set forms a contiguous interval. Here $\{1, 2, 3, 4, 5, 6\}$ forms a contiguous interval (all the members of the interval are covered). Furthermore, each element is repeated exactly once. Consequently, the set S of Equation 13 is a difference set.

As to PRTs, for the example set $S=\{0, 1, 5\}$, the frequency domain representation may be given by A, where:

$$A=[1\ 1\ 0\ 0\ 0\ 1\ 0] \quad (14)$$

The values of the matrix A are realized by recognizing that the $0^{th}$ value of the nine values in A is set to 1, the $1^{st}$ value of the nine values is set to 1, and the $5^{th}$ value of the nine values is set to 1; this corresponds to the set $S=\{0, 1, 5\}$. Next, the autocorrelation of A is determined:

$$A*\overline{A}=[3\ 1\ 1\ 1\ 1\ 1\ 1] \quad (15)$$

The observation may be that when a contiguous interval exists (as in Equation 13), there will be a perfect autocorrelation, as shown in Equation 15. The autocorrelation of A is perfect because at index 0, the autocorrelation has one value and outside of index 0 the autocorrelation has a constant second value, namely 3 and 1, respectively. As shown in Equation 16 below, when an inverse fast Fourier transform is taken of the perfect autocorrelation, that inverse fast Fourier transform is also perfect. Additionally, one can take the square root of the inverse fast Fourier transform to produce the kernel in the time domain, and that too is perfect as shown in Equation 17.

$$ifft(A*\overline{A})=[9\ 2\ 2\ 2\ 2\ 2\ 2] \quad (16)$$

$$\sqrt{|a|}=\sqrt{|ifft(A)|}=[3 1.41.41.41.41.41.4] \quad (17)$$

The above description considers a perfect ruler. In other examples, instead of a perfect ruler, a Golomb ruler may be used. In mathematics, a Golomb ruler is a set of marks at integer positions along an imaginary ruler such that no two pairs of marks are the same distance apart. The number of marks on the ruler corresponds to the order, and the largest distance between two marks corresponds to the length of the ruler. In other words, a Golomb ruler is a set of integers $S \subseteq \{0, \ldots, n-1\}$ such that the pairwise differences of the elements of S modulus n are distinct.

A Golomb ruler that is able to measure all distances up to its length may be referred to as a perfect Golomb ruler. No perfect Golomb ruler exists for five or more marks. A Golomb ruler may be referred to as an optimal Golomb ruler if no shorter Golomb ruler of the same order exists. An optimal (maximally dense) Golomb ruler maximizes |S| for a given n. For specific choices of n, an optimal Golomb ruler may result in a sequence with perfect autocorrelation, which in turn results in a perfect kernel.

Generating an optimal Golomb ruler may be considered to be non-deterministic polynomial-time (NP) hard (NP-hard). In computational complexity theory, NP-hardness is the defining property of a class of problems that are informally at least as hard as the hardest problems in NP. However, there are efficient constructions for near-optimal Golomb rulers, such as the Ruzsa construction:

$$S=q*(1:q-1)+(q-1)*g^{1:(q-1)} \mod q(q-1), \quad (18)$$

where q is a prime and g is a primitive root of $\mathbb{F}_q$.

Given the Ruzsa construction of Equation 18, the absolute value of the set of integers S may be given as:

$$|S|=q-1 \text{ and } n=q(q-1) \quad (19)$$

As used herein, the term Golomb ruler refers to an optimal Golomb ruler, as defined herein. As shown in Table I below, there are currently 27 known optimal Golomb rulers.

TABLE I

Known Optimal Golomb Rulers

| Order (x) | Marks |
|---|---|
| 1 | 0 |
| 2 | 0 1 |
| 3 | 0 1 3 |
| 4 | 0 1 4 6 |
| 5 | 0 1 4 9 11 |
| 6 | 0 1 4 10 12 17 |
| 7 | 0 1 4 10 18 23 25 |
| 8 | 0 1 4 9 15 22 32 34 |
| 9 | 0 1 5 12 25 27 35 41 44 |
| 10 | 0 1 6 10 23 26 34 41 53 55 |
| 11 | 0 1 4 13 28 33 47 54 64 70 72 |
| 12 | 0 2 6 24 29 40 43 55 68 75 76 85 |
| 13 | 0 2 5 25 37 43 59 70 85 89 98 99 106 |
| 14 | 0 4 6 20 35 52 59 77 78 86 89 99 122 127 |
| 15 | 0 4 20 30 57 59 62 76 100 111 123 136 144 145 151 |
| 16 | 0 1 4 11 26 32 56 68 76 115 117 134 150 163 168 177 |
| 17 | 0 5 7 17 52 56 67 80 81 100 122 138 159 165 168 191 199 |
| 18 | 0 2 10 22 53 56 82 83 89 98 130 148 153 167 188 192 205 216 |
| 19 | 0 1 6 25 32 72 100 108 120 130 153 169 187 190 204 231 233 242 246 |
| 20 | 0 1 8 11 68 77 94 116 121 156 158 179 194 208 212 228 240 253 259 283 |
| 21 | 0 2 24 56 77 82 83 95 129 144 179 186 195 255 265 285 293 296 310 329 333 |
| 22 | 0 1 9 14 43 70 106 122 124 128 159 179 204 223 253 263 270 291 330 341 353 356 |
| 23 | 0 3 7 17 61 66 91 99 114 159 171 199 200 226 235 246 277 316 329 348 350 366 372 |
| 24 | 0 9 33 37 38 97 122 129 140 142 152 191 205 208 252 278 286 326 332 353 368 384 403 425 |
| 25 | 0 12 29 39 72 91 146 157 160 161 166 191 207 214 258 290 316 354 372 394 396 431 459 467 480 |
| 26 | 0 1 33 83 104 110 124 163 185 200 203 249 251 258 314 318 343 356 386 430 440 456 464 475 487 492 |
| 27 | 0 3 15 41 66 95 97 106 142 152 220 221 225 242 295 330 338 354 382 388 402 415 486 504 523 546 553 |

Figure 9:
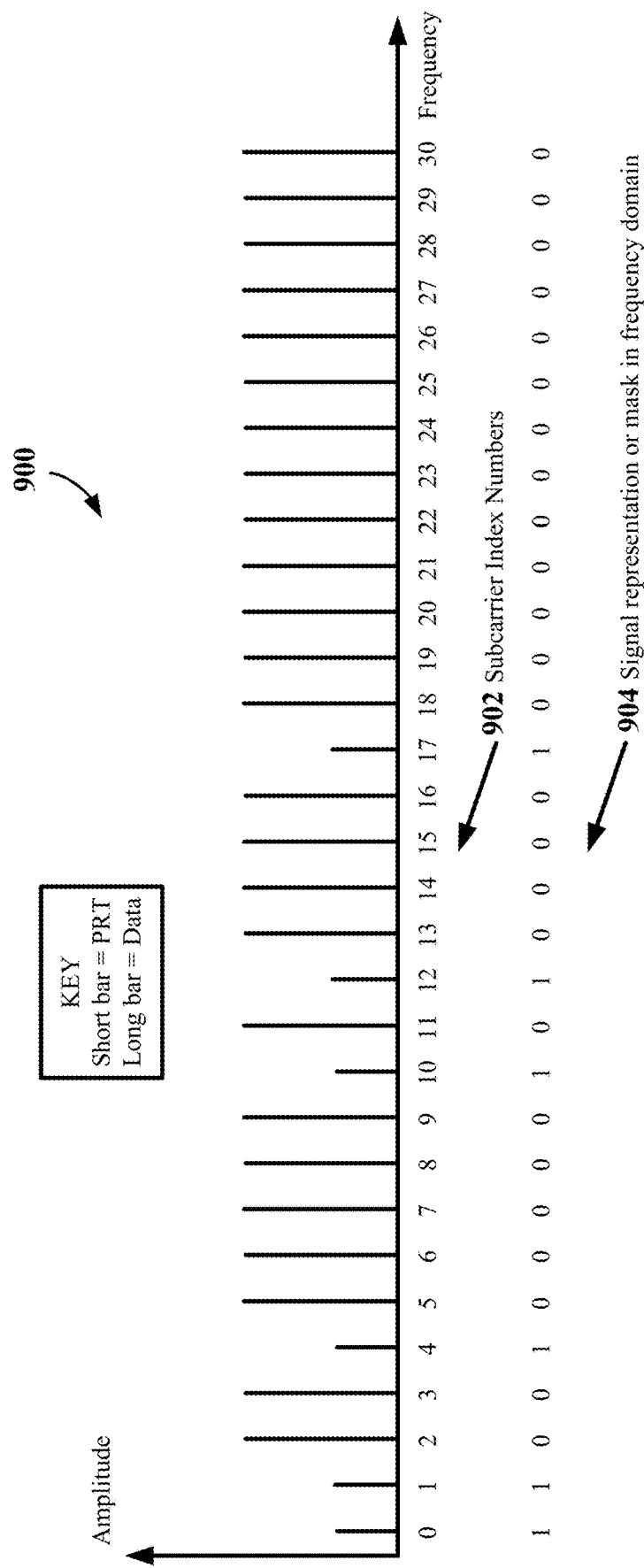
FIG. 9 is a diagram of an example representation of an RF signal in the frequency domain including 31 tones (subcarriers), where 25 of the tones are data tones and 6 of the tones are peak reduction tones (PRTs) according to some aspects of the disclosure.

FIG. 9 is a diagram of an example representation of an RF signal 900 in the frequency domain including 31 tones (subcarriers), where 25 of the tones are data tones (e.g., the first subset of the plurality of tones) and 6 of the tones are peak reduction tones (PRTs) (e.g., the second subset of the plurality of tones) according to some aspects of the disclosure. The subcarrier index numbers 902 running from index value 0 to index value 30 are identified. The signal representation, or mask, in the frequency domain 904, with binary 1 indicating a subcarrier used for a PRT and binary 0 indicating a subcarrier used for data, is illustrated. The RF signal of FIG. 9 may be used in the calculation of the complementary cumulative distribution function (CCDF) of PAPR per symbol, illustrated in FIG. 10A and the CCDF of PAPR per tone illustrated in FIG. 10B.

Figure 10A:
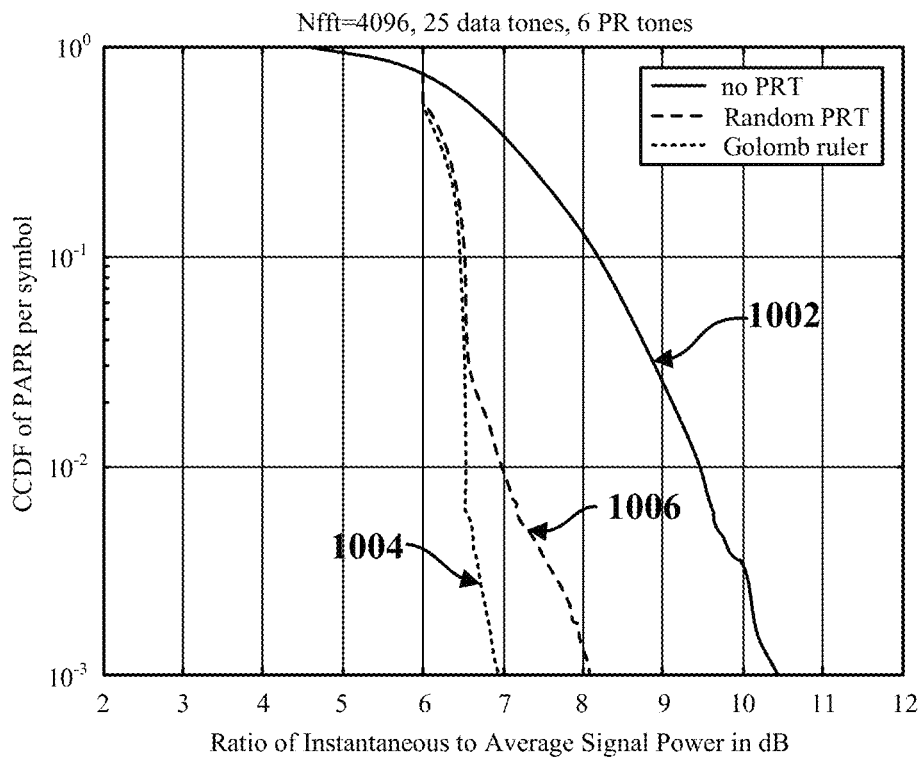
FIG. 10A is a diagram illustrating the cumulative distribution function (CCDF) of peak-to-average power ratio (PAPR) per symbol for the RF signal of 31 tones illustrated in FIG. 9 according to some aspects of the disclosure.
Figure 10B:
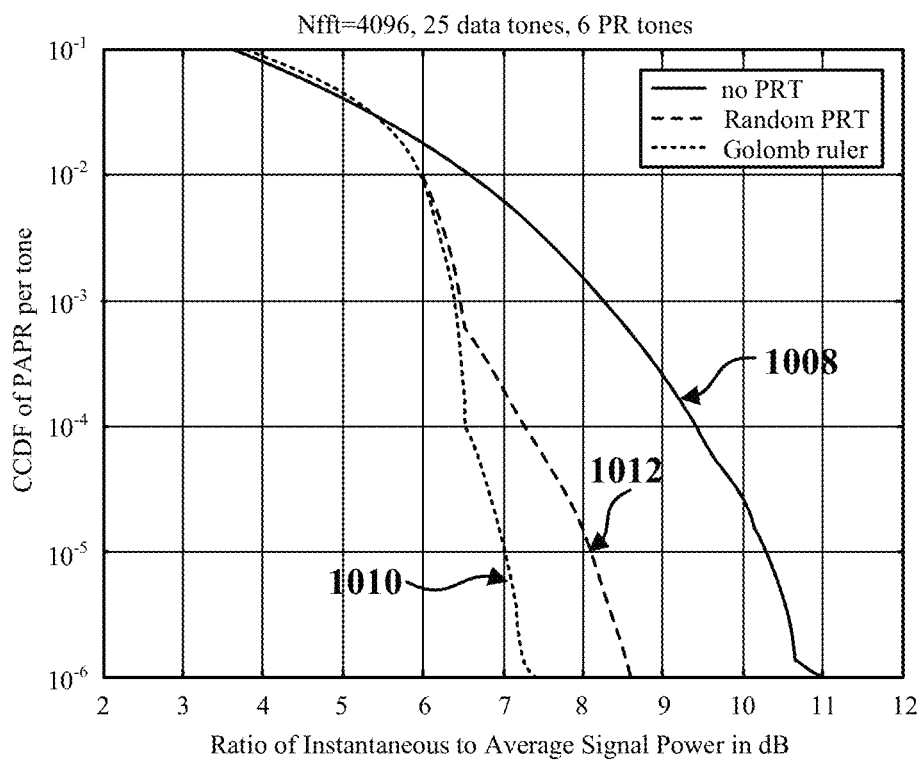
FIG. 10B is a diagram illustrating the CCDF of PAPR per tone for the same RF signal of 31 tones illustrated in FIG. 9 according to some aspects of the disclosure.

FIG. 10A is a diagram illustrating the cumulative distribution function (CCDF) of peak-to-average power ratio (PAPR) per symbol for the RF signal of 31 tones illustrated in FIG. 9 according to some aspects of the disclosure. FIG. 10B is a diagram illustrating the CCDF of PAPR per tone for the same RF signal of 31 tones illustrated in FIG. 9 according to some aspects of the disclosure. The CCDF curves of FIGS. 10A and 10B show the probability that the instantaneous signal power will be higher than the average signal power by a certain amount of dB. As described in connection with FIG. 9, the RF signal includes 31 tones (subcarriers), where 25 of the tones are data tones, and 6 of the tones are peak reduction tones (PRTs). In FIGS. 10A and 10B, the measure of the ratio of instantaneous signal power to average signal power in dB is provided on the horizontal axis, while the CCDF of PAPR per symbol and CCDF of the PAPR per tone are provided on the vertical axis.

Turning to FIG. 10A, the CCDF of the peak-to-average power ratio (PAPR) in dB is highest if no PRT 1002 technique is used to reduce the PAPR, lowest if an optimal Golomb ruler 1004 is used to implement the PRT technique to reduce the PAPR, and somewhere between the no PRT 1002 case and the optimal Golomb ruler 1004 case if random PRTs 1006 are used to implement the PRT technique to reduce the PAPR.

Turning to FIG. 10B, the CCDF of the peak-to-average power ratio (PAPR) in dB is highest if no PRT 1008 technique is used to reduce the PAPR, lowest if an optimal Golomb ruler 1010 is used to implement the PRT technique to reduce the PAPR, and somewhere between the no PRT 1008 case and the optimal Golomb ruler 1010 case if random PRTs 1012 are used to implement the PRT technique to reduce the PAPR.

As explained above and illustrated in Table I, the highest order of known optimal Golomb rulers is 27 (i.e., x=27). As used herein, the value of the order corresponds to the number of peak reduction tones (PRTs). Given that an optimal Golomb ruler of order x is suitable for reducing the PAPR of a signal of length$\approx x^2$ tones, the optimal Golomb ruler of order 27 will support up to $27^2$ tones; that is, 27*27=729 tones, or 729/12$\approx$60 RBs (given that there are 12 tones per RB). Here, the 729 tones refer to the total number of tones (e.g., the data tones plus the PRTs) of an RF signal. A transmitter may utilize more than 60 RBs. For example, for a channel that has a 100 MHz bandwidth, a transmitter may utilize up to 273 RBs (corresponding to 3276 tones).

If a transmitter utilizes 60 RBs or less, the following process may be used to construct the PRT sequence used by the transmitter:

1. Let x represent the square root of the number of tones in the set of resources utilized by the transmitter, rounded up to a closest positive integer (e.g., the transmitter utilizes a plurality of about $x^2$ tones, where there are 12 tones per RB).
2. Select from Table I, above, a Golomb ruler of order x. The marks on the Golomb ruler represent peak reduction tone indices.
3. Construct the PRT sequence, r, as a sequence of zeros and ones of a quantity equal to the number of tones utilized by the transmitter. The value of the sequence is equal to 1 at the selected peak reduction tone indices and zero otherwise. It should be understood that the use of the binary 1 at the selected peak tone indices and zero otherwise is only exemplary. It is within the scope of the disclosure to use the binary 0 at the selected peak tone indices and 1 otherwise.

The PRT sequence r, constructed in the example above and in the examples that follow, may be interpreted in the frequency domain. PRT sequence r may be similar to the frequency domain kernel, P (of Equation 1). It is zero at the data tones and 1 at the peak reduction tones.

If a transmitter utilizes between 60 RBs and 120 RBs, the following process may be used:

1. Obtain a set of marks of a Golomb ruler corresponding to half the number of utilized RBs. Obtaining the set of marks of the Golomb ruler for half the number of utilized RBs reduces the number of resource blocks to at most 60 RBs, which is within the computational limits of 729 tones or 60 RBs identified above.
2. Let an initial PRT sequence (in the time domain) corresponding to this Golomb ruler be r.

3. Uniformly interleave r with one copy of itself to construct (or obtain) the PRT sequence corresponding to the full number of utilized RBs.

This can be equivalently represented as:

$$PRTseq(i) = \begin{cases} r\left(\frac{i}{2}\right) & \text{if } \mod(i, 2) = 0 \\ r\left(\frac{i-1}{2}\right) & \text{if } \mod(i, 2) = 1 \end{cases} \quad (20)$$

where i is the index number of a tone (e.g., i=subcarrier index number), and the nomenclature mod(i, 2) means "i mod 2."

One half of 60 to 120 RBs corresponds to 30 to 60 RBs, respectively. With 12 tones per RB, this corresponds to 360 to 720 tones, respectively. The square roots of 360 to 720 tones rounded up to the closest positive integer correspond to 19 to 27 tones, respectively, which correspond to Golomb rulers of order 19 to 27, respectively. Providing an example using Golomb rulers having these large orders would be unwieldy. To provide a more easily understood example, suppose the total number of RBs was 1.5 RBs. Half of 1.5 RBs corresponds to 0.75 RBs, which corresponds to 9 tones (i.e., $x^2=9$). The Golomb ruler order is given by the square root of the total number of tunes (i.e., order=x=$\sqrt{9}$=3). From Table I, the Golomb ruler corresponding to the order of 3 is {0,1,3} in the frequency domain. Given that the marks of the Golomb ruler are {0,1,3}, an initial PRT sequence of length 9 (corresponding to the 9 tones) in the time domain may be expressed as r=[1 1 0 1 0 0 0 0 0]. Notice that the marks having the binary value of 1 correspond to "indices" 0, 1, and 3. In this PRT sequence, indices 0, 1, and 3 are set to a binary value of 1 while the remaining indices (2, 4, 5, 6, 7, and 8), corresponding to data, are set to 0. That is, the $0^{th}$ tone of the nine tones is set to 1, the $1^{st}$ tone of the nine tones is set to 1, and the $3^{rd}$ tone of the nine tones is set to 1 (corresponding to the Golomb ruler of {0,1,3}), while the remaining tones of the set are set to 0. The total number of RBs (i.e., 2*0.75 RBs=1.5 RBs) corresponds to 18 tones (i.e., 2*0.75 RBs=1.5 RBs=18 tones) in the time domain.

To obtain the entire PRT sequence for 18 tones, the transmitter may uniformly interleave r ([1 1 0 1 0 0 0 0 0]) with one copy of itself ([1 1 0 1 0 0 0 0 0]), which yields: r=[1 1 1 1 0 0 1 1 0 0 0 0 0 0 0 0 0 0], where italics are used only to highlight the interleaving of r with the copy of itself. The same PRT sequence may be constructed using Equation 20. In the example, i, which is an index that spans the total number of tones, is 18 (corresponding to subcarrier index numbers i of 0-17). For i=0, 0 mod 2=0, so the PRTseq for the $0^{th}$ element would be r(0/2)=r(0)=1. For i=1, 1 mod 2=1, so the PRTseq for the $1^{st}$ element would be r(1-1/2)=r(0)=1. For i=2, 2 mod 2=0, so the PRTseq for the $2^{nd}$ element would be r(2/2)=r(1)=1. For i=3, 3 mod 2=1, so the PRTseq for the 3rd element would be $$r\left(\frac{3-1}{2}\right) = r(2/2) = r(1) = 1.$$

For i=4, 4 mod 2=0, so the PRTseq for the 4th element would be r(4/2)=r(2)=0. For i=5, 5 mod 2=1, so the PRTseq for the 5th element would be $$r\left(\frac{5-1}{2}\right) = r(4/2) = r(2) = 0.$$

For i=6, 6 mod 2=0, so the PRTseq for the 6th element would be r(6/2)=r(3)=1. For i=7, 7 mod 2=1, so the PRTseq for the 7th element would be $$r\left(\frac{7-1}{2}\right) = r(3) = 1.$$

For i=8, 8 mod 2=0, so the PRTseq for the 8th element would be r(8/2)=r(4)=0. For i=9, 9 mod 2=1, so the PRTseq for the 9th element would be $$r\left(\frac{9-1}{2}\right) = r(8/2) = r(4) = 0 \ldots$$

and so on. The sequence may continue to be constructed in this manner.

If a transmitter utilizes between 120 RBs and 180 RBs, the following process may be used:
1. Obtain a set of marks of a Golomb ruler corresponding to one third of the number of utilized RBs. Obtaining the set of marks of the Golomb ruler for one third of the number of utilized RBs reduces the number of resource blocks to at most 60 RBs, which is within the computational limits of 729 tones or 60 RBs identified above.
2. Let an initial PRT sequence corresponding to this Golomb ruler be r.
3. Uniformly interleave r with two copies of itself to construct (or obtain) the PRT sequence corresponding to the number of utilized RBs.

This can be equivalently represented as:

$$PRTseq(i) = \begin{cases} r\left(\frac{i}{3}\right) & \text{if } \mod(i, 3) = 0 \\ r\left(\frac{i-1}{3}\right) & \text{if } \mod(i, 3) = 1 \\ r\left(\frac{i-2}{3}\right) & \text{if } \mod(i, 3) = 2 \end{cases} \quad (21)$$

If a transmitter utilizes between 180 RBs and 240 RBs, the following process may be used:
1. Obtain a set of marks of a Golomb ruler corresponding to one fourth of the number of utilized RBs. Obtaining the set of marks of the Golomb ruler for one fourth of the number of utilized RBs reduces the number of resource blocks to at most 60 RBs, which is within the computational limits of 729 tones or 60 RBs identified above.
2. Let an initial PRT sequence corresponding to this ruler be r.
3. Uniformly interleave r with three copies of itself to construct (or obtain) the PRT sequence corresponding to the number of utilized RBs.

This can be equivalently represented as:

$$PRTseq(i) = \begin{cases} r\left(\frac{i}{4}\right) & \text{if } \mod(i, 4) = 0 \\ r\left(\frac{i-1}{4}\right) & \text{if } \mod(i, 4) = 1 \\ r\left(\frac{i-2}{4}\right) & \text{if } \mod(i, 4) = 2 \\ r\left(\frac{i-3}{4}\right) & \text{if } \mod(i, 4) = 3 \end{cases} \quad (22)$$

If a transmitter utilizes between 240 RBs and 300 RBs, the following process may be used:
1. Obtain a set of marks of a Golomb ruler corresponding to one fifth of the number of utilized RBs. Obtaining the set of marks of the Golomb ruler for one fifth of the number of utilized RBs reduces the number of resource blocks to at most 60 RBs, which is within the computational limits of 729 tones or 60 RBs identified above.
2. Let an initial PRT sequence corresponding to this ruler be r.
3. Uniformly interleave r with four copies of itself to construct (or obtain) the PRT sequence corresponding to the number of utilized RBs.

This can be equivalently represented as:

$$PRTseq(i) = \begin{cases} r\left(\frac{i}{5}\right) & \text{if } \mod(i, 5) = 0 \\ r\left(\frac{i-1}{5}\right) & \text{if } \mod(i, 5) = 1 \\ r\left(\frac{i-2}{5}\right) & \text{if } \mod(i, 5) = 2 \\ r\left(\frac{i-3}{5}\right) & \text{if } \mod(i, 5) = 3 \\ r\left(\frac{i-4}{5}\right) & \text{if } \mod(i, 5) = 4 \end{cases} \quad (23)$$

Employing the PRT techniques described herein may lower the PAPR without requiring a transmitter to optimize the location of PRTs. Optimization of location may not be required because, according to aspects described herein, for a given set of resources, the location of the PRTs (e.g., the PRT sequence) is known in advance to both the transmitter and a receiver. According to some aspects, the location of the PRTs in any given set of resources may be predetermined and fixed in a specification that covers, for example, the use of uplink and downlink resources for scheduled entities and scheduling entities. Furthermore, the PRT techniques described herein may avoid implementation of a new channel for informing the receiver of the location (e.g., the PRT sequence) of tones selected for use as PRTs, because the transmitter and receiver both know in advance for any given set of resources, the PRT sequence that identifies tones used as PRTs.

Figure 11:
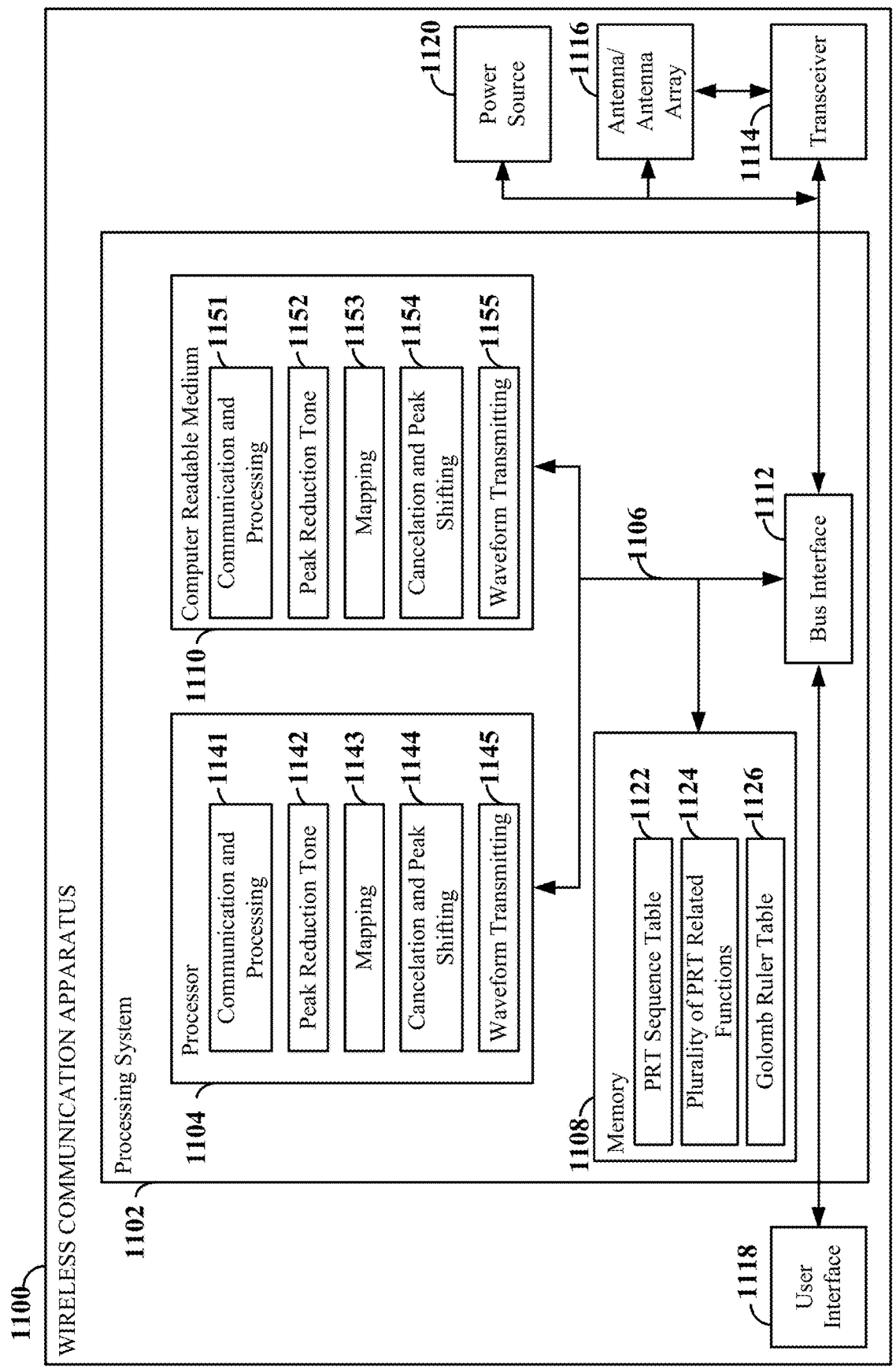
FIG. 11 is a block diagram illustrating an example of a hardware implementation of a wireless communication apparatus employing a processing system according to some aspects of the disclosure.

FIG. 11 is a block diagram illustrating an example of a hardware implementation for a wireless communication apparatus 1100 employing a processing system 1102 according to some aspects of the disclosure. The wireless communication apparatus 1100 may be, for example, a scheduling entity, which may be exemplified as a base station, an eNB, a gNB, a network access node as illustrated in any one or more of FIGS. 1 and/or 2. Alternatively, the wireless communication apparatus 1100 may be, for example, a scheduled entity, which may be exemplified as a UE or mobile communication device as illustrated in any one or more of FIGS. 1 and/or 2.

In accordance with various aspects of the disclosure, an element, or any portion of an element, or any combination of elements may be implemented with a processing system 1102 that includes one or more processors, such as processor 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication apparatus 1100 may be configured to perform any one or more of the functions described herein. That is, the processor 1104, as utilized in the wireless communication apparatus 1100, may be used to implement any one or more of the methods or processes described and illustrated, for example, in FIGS. 10, 11, and/or 12.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1102 may be implemented with a bus architecture, represented generally by the bus 1106. The bus 1106 may include any number of interconnecting buses and bridges depending on the specific application of the processing system 1102 and the overall design constraints. The bus 1106 communicatively couples together various circuits, including one or more processors (represented generally by the processor 1104), a memory 1108, and computer-readable media (represented generally by the computer-readable medium 1110). The bus 1106 may also link various other circuits such as timing sources, peripherals, voltage regulators, and power management circuits, which are well known in the art, and therefore, will not be described any further.

A bus interface 1112 provides an interface between the bus 1106 and a transceiver 1114. The transceiver 1114 may be a wireless transceiver. The transceiver 1114 may provide a means for communicating with various other apparatus over a transmission medium (e.g., air interface). The transceiver 1114 may further be coupled to one or more antenna(s)/antenna array(s) (hereinafter antenna 1116). In some examples, the transceiver 1114 and the antenna 1116 may be configured to transmit and receive using directional beamforming (e.g., using a single beam or a beam pair link (BPL) on each of the uplink and downlink transmissions). The bus interface 1112 further provides an interface between the bus 1106 and a user interface 1118 (e.g., keypad, display, touch screen, speaker, microphone, control features, etc.). Of course, such a user interface 1118 is optional and may be omitted in some examples. In addition, the bus interface 1112 further provides an interface between the bus 1106 and a power source 1120 of the wireless communication apparatus 1100.

The processor 1104 is responsible for managing the bus 1106 and general processing, including the execution of software stored on the computer-readable medium 1110. The software, when executed by the processor 1104, causes the processing system 1102 to perform the various functions described below for any particular apparatus. The computer-readable medium 1110 and the memory 1108 may also be used for storing data that is manipulated by the processor 1104 when executing software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1110. When executed by the processor 1104, the software may cause the processing system 1102 to perform the various processes and functions described herein for any particular apparatus.

The computer-readable medium 1110 may be a non-transitory computer-readable medium and may be referred to as a computer-readable storage medium or a non-transitory computer-readable medium. The non-transitory computer-readable medium may store computer-executable code (e.g., processor-executable code). The computer-executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1110 may reside in the processing system 1102, external to the processing system 1102, or distributed across multiple entities including the processing system 1102. The computer-readable medium 1110 may be embodied in a computer program product or article of manufacture. By way of example, a computer program product or article of manufacture may include a computer-readable medium in packaging materials. In some examples, the computer-readable medium 1110 may be part of the memory 1108. Those skilled in the art will recognize how best to implement the described functionality presented throughout this disclosure depending on the particular application and the overall design constraints imposed on the overall system.

In some aspects of the disclosure, the processor 1104 may include communication and processing circuitry 1141 configured for various functions, including, for example, communicating with a scheduled entity (e.g., a wireless communication device, a UE), a network core (e.g., a 5G core network), other scheduling entities, or any other entity, such as, for example, local infrastructure or an entity communicating with the wireless communication apparatus 1100 via the Internet, such as a network provider. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1141 may include one or more transmit/receive chains.

In some implementations where the communication involves receiving information, the communication and processing circuitry 1141 may obtain information from a component of the wireless communication apparatus 1100 (e.g., from the transceiver 1114 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1108, or to the bus interface 1112. In some examples, the communication and processing circuitry 1141 may receive one or more of: signals, messages, other information, or any combination thereof. In some examples, the communication and processing circuitry 1141 may receive information via one or more channels. In some examples, the communication and processing circuitry 1141 may include functionality for a means for receiving. In some examples, the communication and processing circuitry 1141 may include functionality for a means for processing, including a means for demodulating, a means for decoding, etc.

In some implementations where the communication involves sending (e.g., transmitting) information, the communication and processing circuitry 1141 may obtain information (e.g., from another component of the processor 1104, the memory 1108, or the bus interface 1112), process (e.g., modulate, encode, etc.) the information, and output the processed information. For example, the communication and processing circuitry 1141 may output the information to the transceiver 1114 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may include functionality for a means for sending (e.g., a means for transmitting). In some examples, the communication and processing circuitry 1141 may include functionality for a means for generating, including a means for modulating, a means for encoding, etc. In some examples, the communication and processing circuitry 1141 may be configured to receive and process uplink traffic and uplink control messages (e.g., similar to uplink traffic 116 and uplink control 118 of FIG. 1) and process and transmit downlink traffic and downlink control messages (e.g., similar to downlink traffic 112 and downlink control 114) via the antenna 1116 and the transceiver 1114.

In some examples, the communication and processing circuitry 1141 may further be configured to obtain downlink control information (DCI) and uplink cancellation indication (ULCI) messages that may be used to allocate resources defining uplink channels to one or a group of scheduled entities, and to cancel at least a portion of the allocated resources for the defined uplink channels. The communication and processing circuitry 1141 may further be configured to execute communication and processing software 1151 stored on the computer-readable medium 1110 to implement one or more functions described herein.

In some aspects of the disclosure, the processor 1104 may include peak reduction tone (PRT) circuitry 1142 configured for various functions, including, for example, obtaining (e.g., receiving via control signaling or otherwise) a set of resources that includes a plurality of tones. According to some aspects, the set of resources may include at least one of: a non-contiguous set of resource blocks, or a non-contiguous set of subcarriers. The PRT circuitry 1142 may further be configured, for example, to obtain a predetermined sequence of peak reduction tones (PRTs). The predetermined sequence of PRTs may correspond to a set of granted resources including a plurality of tones. As used herein, the phrases a "set of granted resources" and a "set of resources" are used interchangeably herein, without regard to whether the resources are granted or assigned. According to some aspects, the wireless communication apparatus may be pre-configured with the predetermined sequence of PRTs corresponding to the set of granted resources including a plurality of tones.

In some examples, the PRT circuitry 1142 may obtain the predetermined sequence of PRTs by at least one of: obtaining the predetermined sequence of PRTs from the memory 1108 of the wireless communication apparatus 1100, obtaining the predetermined sequence of PRTs from a table (e.g., PRT sequence table 1122) that may be stored in the memory 1108 of the wireless communication apparatus 1100, or constructing the predetermined sequence of PRTs from a plurality of PRT-related functions 1124 that may be stored in the memory 1108 of the wireless communication apparatus 1100. Examples of PRT-related functions may include, without limitation, any one or more of Equations 1-23 expressed herein.

In some examples, the PRT circuitry 1142 may obtain the predetermined sequence of PRTs by: determining a number D, corresponding to a ratio of a number of resource blocks (RBs) in the set of resources to 60 RBs (e.g., granted or assigned resources as used interchangeably herein), rounded up to a closest positive integer, obtaining a set of marks of a Golomb ruler corresponding to 1/D multiplied by the number of RBs in the set of resources, constructing an initial sequence, r, equal to the PRT sequence corresponding to the Golomb ruler, and interleaving r with D-1 copies of r to construct the predetermined sequence of PRTs. By way of example, if the ratio of the number of RBs in the set of resources to 60 RBs was equal to 1.1, the value of 1.1 rounded up to the nearest positive integer would be equal to 2. In some examples, Golomb rulers of order x, and the marks of the respective Golomb rulers of order x, may be stored in a table, such as the Golomb ruler table 1126. An example of an optimal Golomb ruler table is provided as Table I herein.

According to some aspects, the PRT circuitry 1142 may construct (e.g., obtain) the predetermined sequence of PRTs (e.g., PRTseq(i), where i={1, ..., N} and N is an integer corresponding to a total number of subcarriers in the set of resources (also referred to herein as the set of granted resources)), based on:

for D=1:
  determining a square root, x, of the total number of subcarriers in the set of resources, rounded up to a closest positive integer;
  selecting a Golomb ruler of order x, where marks on the Golomb ruler represent peak reduction tone indices; and
  constructing the PRTseq(i) as a sequence of zeros and ones of length equal to the total number of subcarriers, wherein PRTseq(i) is equal to 1 at the peak reduction tone indices and zero otherwise;

for $D = 2$:

$$PRTseq(i) = \begin{cases} r\left(\frac{i}{2}\right) & \text{if } \mod(i, 2) = 0 \\ r\left(\frac{i-1}{2}\right) & \text{if } \mod(i, 2) = 1 \end{cases} ;$$

for $D = 3$:

$$PRTseq(i) = \begin{cases} r\left(\frac{i}{3}\right) & \text{if } \mod(i, 3) = 0 \\ r\left(\frac{i-1}{3}\right) & \text{if } \mod(i, 3) = 1 \\ r\left(\frac{i-2}{3}\right) & \text{if } \mod(i, 3) = 2 \end{cases} ;$$

for $D = 4$:

$$PRTseq(i) = \begin{cases} r\left(\frac{i}{4}\right) & \text{if } \mod(i, 4) = 0 \\ r\left(\frac{i-1}{4}\right) & \text{if } \mod(i, 4) = 1 \\ r\left(\frac{i-2}{4}\right) & \text{if } \mod(i, 4) = 2 \\ r\left(\frac{i-3}{4}\right) & \text{if } \mod(i, 4) = 3 \end{cases} ; \text{ and}$$

for $D = 5$:

$$PRTseq(i) = \begin{cases} r\left(\frac{i}{5}\right) & \text{if } \mod(i, 5) = 0 \\ r\left(\frac{i-1}{5}\right) & \text{if } \mod(i, 5) = 1 \\ r\left(\frac{i-2}{5}\right) & \text{if } \mod(i, 5) = 2 \\ r\left(\frac{i-3}{5}\right) & \text{if } \mod(i, 5) = 3 \\ r\left(\frac{i-4}{5}\right) & \text{if } \mod(i, 5) = 4 \end{cases} .$$

In some examples, the PRT circuitry 1142 may include one or more hardware components that provide the physical structure that performs processes related to obtaining the set of granted resources that includes the plurality of tones and obtaining the predetermined sequence of peak reduction tones (PRTs) corresponding to the set of granted resources. The PRT circuitry 1142 may further be configured to execute peak reduction tone software 1152 stored on the computer-readable medium 1110 to implement one or more functions described herein.

In some aspects of the disclosure, the processor 1104 may include mapping circuitry 1143 configured for various functions, including, for example, mapping a set of data to a first subset of the plurality of tones (in the set of resources, also referred to as the set of granted resources) outside of the predetermined sequence of PRTs, and mapping a set of PRTs to a second subset of the plurality of tones within the predetermined sequence of PRTs. According to some aspects, only the first subset of the plurality of tones is intended to be decoded. In some examples, the mapping circuitry 1143 may include one or more hardware components that provide the physical structure that performs processes related to performing the mapping of the set of data to the first subset of the plurality of tones outside of the predetermined sequence of PRTs, and the mapping a set of PRTs to the second subset of the plurality of tones within the predetermined sequence of PRTs. The mapping circuitry 1143 may further be configured to execute mapping software 1153 stored on the computer-readable medium 1110 to implement one or more functions described herein.

In some aspects of the disclosure, the processor 1104 may include cancelation and peak shifting circuitry 1144 configured for various functions, including, for example, canceling at least one peak of a time domain representation of the first subset of the plurality of tones using a time domain representation of the second subset of the plurality of tones. According to some aspects, the canceling of the at least one peak of the time domain representation of the first subset of the plurality of tones using a time domain representation of the second subset of the plurality of tones may include shifting a phase and scaling an amplitude of the time domain representation of the second subset of the plurality of tones to align a target peak of the time domain representation of the first subset of the plurality of tones with a peak of the shifted and scaled time domain representation of the second subset of the plurality of tones, subtracting the shifted and scaled time domain representation of the second subset of the plurality of tones from the time domain representation of the first subset of the plurality of tones to obtain a time domain representation of the plurality of tones, and repeating the shifting, the scaling, and the subtracting until all peaks of the time domain representation of the plurality of tones are less than a predefined threshold. In some examples, the cancelation and peak shifting circuitry 1144 may include one or more hardware components that provide the physical structure that performs processes related to performing the canceling at least the one peak of the time domain representation of the first subset of the plurality of tones using the time domain representation of the second subset of the plurality of tones. The cancelation and peak shifting circuitry 1144 may further be configured to execute peak cancelation software 1154 stored on the computer-readable medium 1110 to implement one or more functions described herein.

In some aspects of the disclosure, the processor 1104 may include waveform transmitting circuitry 1145 configured for various functions, including, for example, transmitting a transmitted waveform comprising the first subset of the plurality of tones and the second subset of the plurality of tones (e.g., the plurality of tones). In some examples, the waveform transmitting circuitry 1145 may include one or more hardware components that provide the physical structure that performs processes related to performing the transmitting of the transmitted waveform comprising the first subset of the plurality of tones and the second subset of the plurality of tones. The waveform transmitting circuitry 1145 may further be configured to execute waveform transmitting software 1155 stored on the computer-readable medium 1110 to implement one or more functions described herein.

Figure 12:
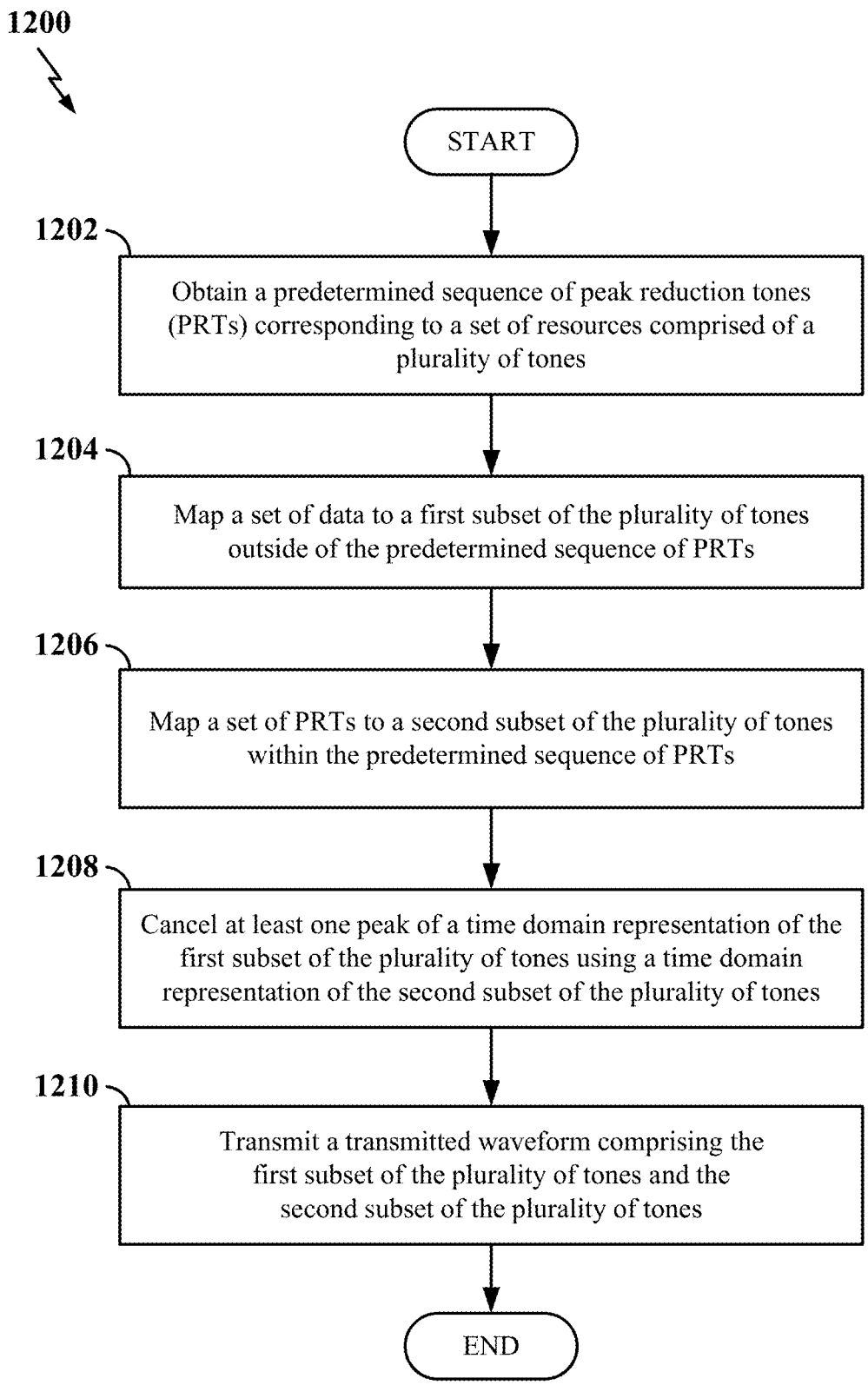
FIG. 12 is a flow chart illustrating an exemplary process at a wireless communication apparatus for wireless communication according to some aspects of the disclosure.

FIG. 12 is a flow chart illustrating an exemplary process 1200 (e.g., a method of wireless communication) at a wireless communication apparatus (e.g., a scheduling entity or a scheduled entity) in a wireless communication network according to some aspects of the disclosure. The wireless communication apparatus may obtain a predetermined sequence of peak reduction tones (PRTs), which may correspond to a set of (granted) resources that includes one or more resource blocks, each including a plurality of tones (e.g., 12 tones or subcarriers). In one example, the predetermined sequence of PRTs may correspond to the marks on a Golomb ruler having an order that is a function of a total number of tones in the set of resources. The wireless communication apparatus may map a set of data (e.g., control and/or traffic) to a first subset of the plurality of tones outside of the predetermined sequence of PRTs and may map a set of PRTs to a second subset of the plurality of tones within the predetermined sequence of PRTs. The wireless communication apparatus may cancel at least one peak of a time domain representation of the first subset of the plurality of tones using a time domain representation of the second subset of the plurality of tones and may transmit a transmitted waveform comprising the first subset of the plurality of tones and the second subset of the plurality of tones (e.g., the plurality of tones). Implementation of the process may reduce the PAPR of transmitted signals. As described below, some or all illustrated features may be omitted in a particular implementation within the scope of the present disclosure, and some illustrated features may not be required for all implementations. In some examples, the process 1200 may be carried out by the wireless communication apparatus 1100 (e.g., a scheduling entity or a scheduled entity) illustrated in FIG. 11. In some examples, the process 1200 may be carried out by any suitable apparatus or means for carrying out the functions or algorithms described herein.

At block 1202, the wireless communication apparatus may obtain a predetermined sequence of peak reduction tones (PRTs) corresponding to a set of resources (also referred to as a set of granted resources herein) that include a plurality of tones. In some examples, the set of resources may include at least one of: a non-contiguous set of resource blocks, or a non-contiguous set of subcarriers (the terms "tones" and "subcarriers" are used interchangeably herein, the terms "resources" and "granted resources" are used interchangeably herein). The resources may be OFDM resources as illustrated in the examples of FIGS. 3-10. In some examples, the predetermined sequence of PRTs may be a Golomb ruler having an order that is a function of a total number of tones in the set of resources. A table of exemplary known optimal Golomb rulers of orders 1-27 is provided as Table I, above. For example, the PRT circuitry 1142, shown and described above in connection with FIG. 11, may provide a means for obtaining the predetermined sequence of peak reduction tones (PRTs) that correspond to the set of resources that includes the plurality of tones.

In some examples, the predetermined sequence of PRTs may be obtained by at least one of: obtaining the predetermined sequence of PRTs from a memory of the wireless communication apparatus, obtaining the predetermined sequence of PRTs from a table stored in the memory of the wireless communication apparatus, or constructing the predetermined sequence of PRTs from a plurality of PRT-related functions stored in the memory of the wireless communication apparatus.

In some examples, the predetermined sequence of PRTs may be obtained by determining a number D, corresponding to a ratio of a number of resource blocks (RBs) in the set of resources to 60 RBs (also referred to as a set of granted resources herein), rounded up to the closest positive integer, obtaining a set of marks of a Golomb ruler corresponding to 1/D multiplied by the number of RBs in the set of resources, constructing an initial sequence, r, equal to the PRT sequence corresponding to the Golomb ruler), and interleaving r with D-1 copies of r to construct the predetermined sequence of PRTs.

In other examples, the predetermined sequence of PRTs may be obtained by determining a number D, corresponding to a ratio of a number of resource blocks (RBs) in the set of resources to 60 RBs (also referred to as a set of granted resources herein), rounded up to the closest positive integer, obtaining a set of marks of a Golomb ruler corresponding to 1/D multiplied by the number of RBs in the set of resources, constructing a sequence, r, based on the set of marks of the Golomb ruler, and constructing the predetermined sequence of PRTs (PRTseq(i)), where i={1, ..., N} and N is an integer corresponding to a total number of subcarriers in the set of resources, based on:

for D=1:
  determining a square root, x, of the total number of subcarriers in the set of resources, rounded up to a closest positive integer;
  selecting a Golomb ruler of order x, where marks on the Golomb ruler represent peak reduction tone indices; and
  constructing the PRTseq(i) as a sequence of zeros and ones of length equal to the total number of subcarriers, wherein PRTseq(i) is equal to 1 at the peak reduction tone indices and zero otherwise;

for $D = 2$:

$$PRTseq(i) = \begin{cases} r\left(\frac{i}{2}\right) & \text{if } \mod(i, 2) = 0 \\ r\left(\frac{i-1}{2}\right) & \text{if } \mod(i, 2) = 1 \end{cases};$$

for $D = 3$:

$$PRTseq(i) = \begin{cases} r\left(\frac{i}{3}\right) & \text{if } \mod(i, 3) = 0 \\ r\left(\frac{i-1}{3}\right) & \text{if } \mod(i, 3) = 1 \\ r\left(\frac{i-2}{3}\right) & \text{if } \mod(i, 3) = 2 \end{cases};$$

for $D = 4$:

$$PRTseq(i) = \begin{cases} r\left(\frac{i}{4}\right) & \text{if } \mod(i, 4) = 0 \\ r\left(\frac{i-1}{4}\right) & \text{if } \mod(i, 4) = 1 \\ r\left(\frac{i-2}{4}\right) & \text{if } \mod(i, 4) = 2 \\ r\left(\frac{i-3}{4}\right) & \text{if } \mod(i, 4) = 3 \end{cases}; \text{ and}$$

for $D = 5$:

$$PRTseq(i) = \begin{cases} r\left(\frac{i}{5}\right) & \text{if } \mod(i, 5) = 0 \\ r\left(\frac{i-1}{5}\right) & \text{if } \mod(i, 5) = 1 \\ r\left(\frac{i-2}{5}\right) & \text{if } \mod(i, 5) = 2 \\ r\left(\frac{i-3}{5}\right) & \text{if } \mod(i, 5) = 3 \\ r\left(\frac{i-4}{5}\right) & \text{if } \mod(i, 5) = 4 \end{cases}.$$

At block 1204, the wireless communication apparatus may map a set of data to a first subset of the plurality of tones outside of the predetermined sequence of PRTs. At block 1206, the wireless communication apparatus may map a set of PRTs to a second subset of the plurality of tones within the predetermined sequence of PRTs. Examples of mappings of the first subset of the plurality of tones and the second subset of the predetermined sequence of PRTS may be illustrated in FIGS. 5 and 9 and their related text. For example, the mapping circuitry 1143, shown and described above in connection with FIG. 11, may provide the means for mapping the set of data to the first subset of the plurality of tones outside of the predetermined sequence of PRTs and the means for mapping the set of PRTs to the second subset of the plurality of tones within the predetermined sequence of PRTs.

At block 1208, the wireless communication apparatus may cancel at least one peak of a time domain representation of the first subset of the plurality of tones using a time domain representation of the second subset of the plurality of tones. According to some aspects, the canceling of the at least one peak of the time domain representation of the first subset of the plurality of tones using the time domain representation of the second subset of the plurality of tones may further include shifting a phase and scaling an amplitude of the time domain representation of the second subset of the plurality of tones to align a target peak of the first time domain representation of the plurality of tones with a peak of the shifted and scaled time domain representation of the second subset of the plurality of tones, subtracting the shifted and scaled time domain representation of the second subset of the plurality of tones from the time domain representation of the first subset of the plurality of tones to obtain a time domain representation of the plurality of tones, and repeating the shifting, the scaling, and the subtracting until all peaks of a time domain representation of the plurality of tones are less than a predefined threshold. An example of cancelation is described in connection with FIG. 6 and its associated text. The benefit of cancelation and peak shifting in terms of CCDF of PAPR per resource block and per tone, respectively, is illustrated in FIGS. 10A and 10B and described in their associated text. For example, the cancelation and peak shifting circuitry 1144, shown and described above in connection with FIG. 11, may provide the means for canceling at least one peak of the time domain representation of the first subset of the plurality of tones using the time domain representation of the second subset of the plurality of tones. The cancelation and peak shifting circuitry 1144 may also provide the means for shifting a phase and scaling an amplitude of the time domain representation of the second subset of the plurality of tones to align a target peak of the time domain representation of the first plurality of tones with a peak of the shifted and scaled time domain representation of the second subset of the plurality of tones, a means for subtracting the shifted and scaled time domain representation of the second subset of the plurality of tones from the time domain representation of the first subset of the plurality of tones to obtain a time domain representation of the plurality of tones, and a means for repeating the shifting, the scaling, and the subtracting until all peaks of the time domain representation of the plurality of tones are less than a predefined threshold. Transformations between frequency domain representations of tones and time domain representations of tones may be accomplished by any method known to those of skill in the art. For example, a fast Fourier transform may be used to transform from the time domain to the frequency domain.

At block 1210, the wireless communication apparatus may transmit a transmitted waveform including the first subset of the plurality of tones and the second subset of the plurality of tones (e.g., the plurality of tones). For example, the waveform transmitting circuitry 1145, in cooperation with the transceiver 1114 and antenna(s)/antenna array(s) 1114, as shown and described above in connection with FIG. 11, may provide a means for transmitting a transmitted waveform including the first subset of the plurality of tones and the second subset of the plurality of tones.

Figure 13:
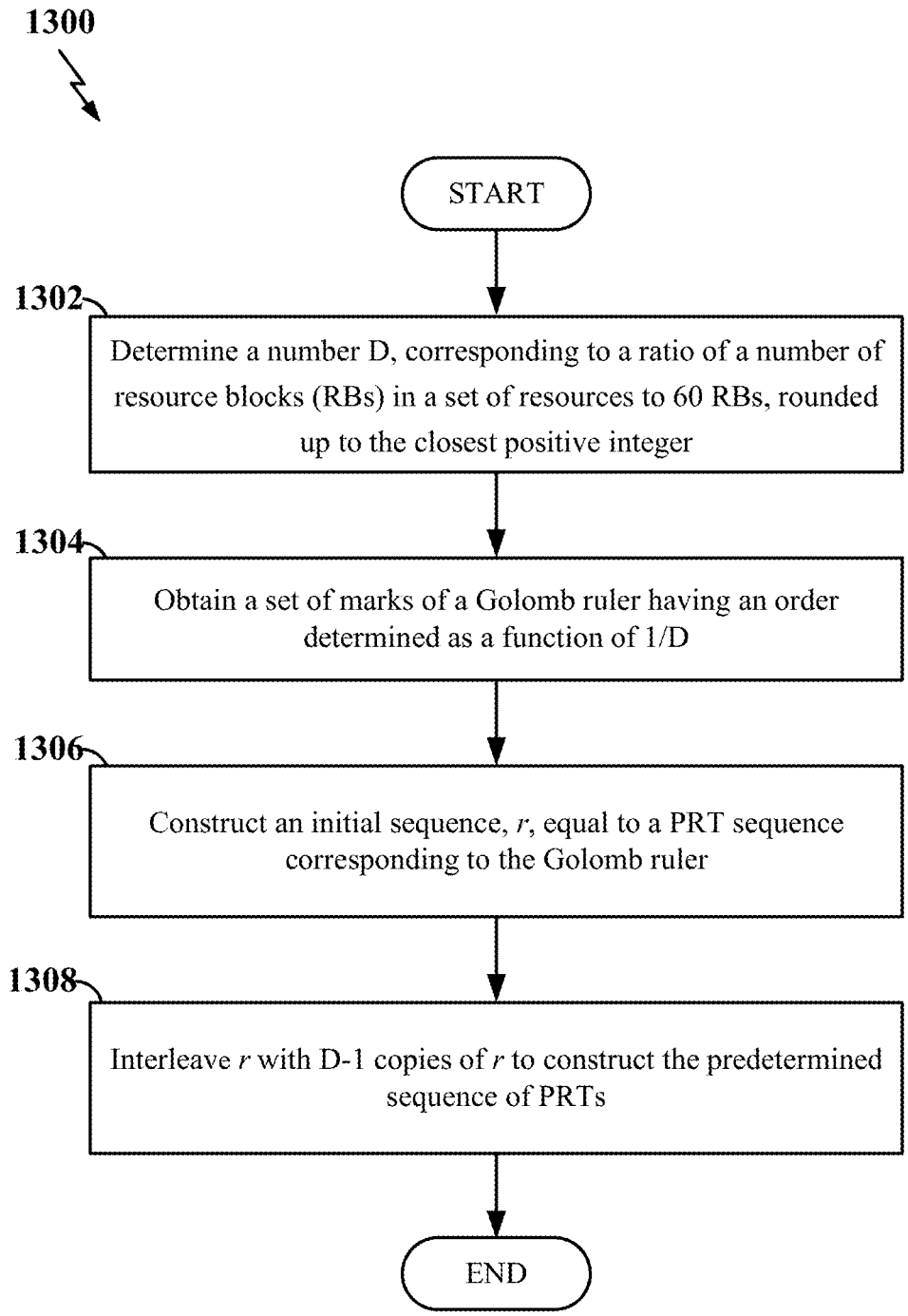
FIG. 13 is a flow chart illustrating another exemplary process at a wireless communication apparatus for wireless communication according to some aspects of the disclosure.

FIG. 13 is a flow chart illustrating another exemplary process 1300 (e.g., a method) at a wireless communication apparatus (e.g., a scheduling entity or a scheduled entity) for wireless communication according to some aspects of the disclosure. According to some aspects, a set of resources (also referred to as a set of granted resources herein) may be expressed as a number (e.g., a quantity) of resource blocks (RBs). At block 1302, the wireless communication apparatus may determine a number D, corresponding to a ratio of the number of RBs in the set of resources to 60 RBs, rounded up to the closest positive integer. For example, the communication and processing circuitry 1141, shown and described above in connection with FIG. 11, may provide the means for determining the number D, corresponding to the ratio of the number of RBs in the set of resources to 60 RBs, rounded up to the closest positive integer.

At block 1304, the wireless communication apparatus may obtain a set of marks of a Golomb ruler (e.g., an optimal Golomb ruler) corresponding to 1/D multiplied by the number of RBs in the set of resources. In one example, 1/D may represent a number (e.g., a quantity) of RBs, and the order may be a function of the number of tones in the quantity of RBs (e.g., order=square root of the number of tones). For example, the PRT circuitry 1142, shown and described above in connection with FIG. 11, may provide the means for obtaining a set of marks of a Golomb ruler corresponding to 1/D multiplied by the number of RBs in the set of resources.

At block 1306, the wireless communication apparatus may construct (e.g., obtain) an initial sequence, r, equal to a PRT sequence corresponding to the Golomb ruler. For example, the PRT circuitry 1142, shown and described above in connection with FIG. 11, may provide the means for constructing the initial sequence, r, equal to the PRT sequence corresponding to the Golomb ruler.

At block 1310, the wireless communication apparatus may interleave r with D-1 copies of r to construct the predetermined sequence of PRTs. For example, the communication and processing circuitry 1141, shown and described above in connection with FIG. 11, may provide the means for interleaving r with D-1 copies of r to construct the predetermined sequence of PRTs.

According to yet other aspects, prior to transmitting a transmitted waveform comprising the first subset of the plurality of tones and the second subset of the plurality of tones (e.g., the plurality of tones), the wireless communication apparatus may further shift a phase and scale an amplitude of a time domain representation of the second subset of the plurality of tones to align a target peak of the time domain representation of the first plurality of tones with a peak of the shifted and scaled time domain representation of the second subset of the plurality of tones, subtracting the shifted and scaled time domain representation of the second subset of the plurality of tones from the time domain representation of the first subset of the plurality of tones to obtain a time domain representation of the plurality of tones, and repeating the shifting, the scaling, and the subtracting until all peaks of the time domain representation of the plurality of tones are less than a predefined threshold. For example, the communication and processing circuitry 1141, the PRT circuitry 1142, and/or the cancelation and peak shifting circuitry 1144 shown and described above in connection with FIG. 11, may provide the means for shifting, the means for subtracting, and/or the means for repeating. Still further, the waveform transmitting circuitry 1145 may provide the means for transmitting the transmitted waveform as described herein.

Of course, in the above examples, the circuitry included in the processor 1104 is merely provided as an example, and other means for carrying out the described functions may be included within various aspects of the present disclosure, including but not limited to the instructions stored in the computer-readable medium 1110, or any other suitable apparatus or means described in any one of the FIGS. 1, 2, and/or 11, and utilizing, for example, the processes and/or algorithms described herein in relation to FIGS. 4-10, 12, and/or 13.

The following provides an overview of the present disclosure:

Aspect 1: A method of wireless communication in a wireless communication network, the method comprising, at a wireless communication apparatus: obtaining a predetermined sequence of peak reduction tones (PRTs) corresponding to a set of granted resources comprised of a plurality of tones, mapping a set of data to a first subset of the plurality of tones outside of the predetermined sequence of PRTs, mapping a set of PRTs to a second subset of the plurality of tones within the predetermined sequence of PRTs, canceling at least one peak of a time domain representation of the first subset of the plurality of tones using a time domain representation of the second subset of the plurality of tones, and transmitting a transmitted waveform comprising the first subset of the plurality of tones and the second subset of the plurality of tones.

Aspect 2: The method of aspect 1, wherein only the first subset of the plurality of tones is intended to be decoded.

Aspect 3: The method of aspect 1 or 2, wherein the wireless communication apparatus is pre-configured with the predetermined sequence of PRTs corresponding to the set of granted resources.

Aspect 4: The method of any of aspects 1 through 3, wherein the set of granted resources comprise at least one of: a non-contiguous set of resource blocks, or a non-contiguous set of subcarriers.

Aspect 5: The method of any of aspects 1 through 4, further comprising: obtaining the predetermined sequence of PRTs by obtaining a Golomb ruler having an order that is a function of a total number of tones in the set of granted resources.

Aspect 6: The method of any of aspects 1 through 4, further comprising obtaining the predetermined sequence of PRTs by at least one of: obtaining the predetermined sequence of PRTs from a memory of the wireless communication apparatus, obtaining the predetermined sequence of PRTs from a table stored in the memory of the wireless communication apparatus, or constructing the predetermined sequence of PRTs from a plurality of PRT-related functions stored in the memory of the wireless communication apparatus.

Aspect 7: The method of any of aspects 1 through 6, wherein the canceling the at least one peak of the time domain representation of the first subset of the plurality of tones using the time domain representation of the second subset of the plurality of tones, further comprises: shifting a phase and scaling an amplitude of the time domain representation of the second subset of the plurality of tones to align a target peak of the time domain representation of the first subset of the plurality of tones with a peak of the shifted and scaled time domain representation of the second subset of the plurality of tones, subtracting the shifted and scaled time domain representation of the second subset of the plurality of tones from the time domain representation of the first subset of the plurality of tones to obtain a time domain representation of the plurality of tones; and repeating the shifting, the scaling, and the subtracting until all peaks of the time domain representation of the plurality of tones are less than a predefined threshold.

Aspect 8: The method of any of aspects 1 through 4 and 7, further comprising, obtaining the predetermined sequence of PRTs by: determining a number D, corresponding to a ratio of a number of resource blocks (RBs) in the set of granted resources to 60 RBs, rounded up to a closest positive integer, obtaining a set of marks of a Golomb ruler corresponding to 1/D multiplied by the number of RBs in the set of granted resources, constructing an initial sequence, r, equal to an initial PRT sequence corresponding to the Golomb ruler; and interleaving r with D-1 copies of r to construct the predetermined sequence of PRTs.

Aspect 9: The method of any of aspects 1 through 4 and 7, further comprising, obtaining the predetermined sequence of PRTs by: determining a number D, corresponding to a ratio of a number of resource blocks (RBs) in the set of granted resources to 60 RBs, rounded up to a closest positive integer, obtaining a set of marks of a Golomb ruler having an index corresponding to 1/D multiplied by the number of RBs in the set of granted resources, constructing a sequence, r, based on the set of marks of the Golomb ruler; and constructing the predetermined sequence of PRTs (PRTseq (i)), wherein i={1, ..., N} and N is an integer corresponding to a total number of subcarriers in the set of granted resources, based on:

for D=1:

determining a square root, x, of the total number of subcarriers in the set of granted resources, rounded up to the closest positive integer, selecting a Golomb ruler of order x, where marks on the Golomb ruler represent peak reduction tone indices; and constructing the PRTseq(i) as a sequence of zeros and ones of length equal to the total number of subcarriers, wherein PRTseq(i) is equal to 1 at the peak reduction tone indices and zero otherwise, for D = 2:

$$PRTseq(i) = \begin{cases} r\left(\frac{i}{2}\right) & \text{if } \mod(i, 2) = 0 \\ r\left(\frac{i-1}{2}\right) & \text{if } \mod(i, 2) = 1 \end{cases}, \text{ for } D = 3:$$

$$PRTseq(i) = \begin{cases} r\left(\frac{i}{3}\right) & \text{if } \mod(i, 3) = 0 \\ r\left(\frac{i-1}{3}\right) & \text{if } \mod(i, 3) = 1 \\ r\left(\frac{i-2}{3}\right) & \text{if } \mod(i, 3) = 2 \end{cases}, \text{ for } D = 4:$$

$$PRTseq(i) = \begin{cases} r\left(\frac{i}{4}\right) & \text{if } \mod(i, 4) = 0 \\ r\left(\frac{i-1}{4}\right) & \text{if } \mod(i, 4) = 1 \\ r\left(\frac{i-2}{4}\right) & \text{if } \mod(i, 4) = 2 \\ r\left(\frac{i-3}{4}\right) & \text{if } \mod(i, 4) = 3 \end{cases} ; \text{ and}$$

for D = 5:

$$PRTseq(i) = \begin{cases} r\left(\frac{i}{5}\right) & \text{if } \mod(i, 5) = 0 \\ r\left(\frac{i-1}{5}\right) & \text{if } \mod(i, 5) = 1 \\ r\left(\frac{i-2}{5}\right) & \text{if } \mod(i, 5) = 2 \\ r\left(\frac{i-3}{5}\right) & \text{if } \mod(i, 5) = 3 \\ r\left(\frac{i-4}{5}\right) & \text{if } \mod(i, 5) = 4 \end{cases}.$$

Aspect 10: A wireless communication apparatus in a wireless communication network, comprising: a wireless transceiver, a memory, and a processor coupled to the wireless transceiver and the memory, wherein the processor and the memory are configured to: obtain a predetermined sequence of peak reduction tones (PRTs) corresponding to a set of granted resources comprised of a plurality of tones, map a set of data to a first subset of the plurality of tones outside of the predetermined sequence of PRTs, map a set of PRTs to a second subset of the plurality of tones within the predetermined sequence of PRTs, cancel at least one peak of a time domain representation of the first subset of the plurality of tones using a time domain representation of the second subset of the plurality of tones, and transmit a transmitted waveform comprising the first subset of the plurality of tones and the second subset of the plurality of tones.

Aspect 11: The wireless communication apparatus of aspect 10, wherein only the first subset of the plurality of tones is intended to be decoded.

Aspect 12: The wireless communication apparatus of aspect 10 or 11, wherein the wireless communication apparatus is pre-configured with the predetermined sequence of PRTs associated with the set of granted resources.

Aspect 13: The wireless communication apparatus of any of aspects 10 through 12, wherein the set of granted resources comprises at least one of: a non-contiguous set of resource blocks, or a non-contiguous set of subcarriers.

Aspect 14: The wireless communication apparatus of any of aspects 10 through 13, wherein the processor and the memory are further configured to obtain the predetermined sequence of PRTs by obtaining an Golomb ruler having an order that is a function of a total number of tones in the set of granted resources.

Aspect 15: The wireless communication apparatus of any of aspects 10 through 13, wherein the processor and the memory are further configured to obtain the predetermined sequence of PRTs by being further configured to at least one of: obtain the predetermined sequence of PRTs from a memory of the wireless communication apparatus, obtain the predetermined sequence of PRTs from a table stored in the memory of the wireless communication apparatus, or construct the predetermined sequence of PRTs from a plurality of PRT-related functions stored in the memory of the wireless communication apparatus.

Aspect 16: The wireless communication apparatus of aspects 10 through 15, wherein the processor and the memory are configured to cancel the at least one peak of the time domain representation of the first subset of the plurality of tones using the time domain representation of the second subset of the plurality of tones by being further configured to: shift a phase and scale an amplitude of the time domain representation of the second subset of the plurality of tones to align a target peak of the time domain representation of the first subset of the plurality of tones with a peak of the shifted and scaled time domain representation of the second subset of the plurality of tones; subtract the shifted and scaled time domain representation of the second subset of the plurality of tones from the time domain representation of the first subset of the plurality of tones to obtain a time domain representation of the plurality of tones, and repeat the shifting, the scaling, and the subtracting until all peaks of the time domain representation of the plurality of tones are less than a predefined threshold.

Aspect 17: The wireless communication apparatus of any of aspects 10 through 13 and 16, wherein the processor and the memory are configured to obtain the predetermined sequence of PRTs by being further configured to: determine a number D, corresponding to a ratio of a number of resource blocks (RBs) in the set of granted resources to 60 RBs, rounded up to a closest positive integer, obtain a set of marks of a Golomb ruler having an index corresponding to 1/D multiplied by the number of RBs in the set of granted resources, construct an initial sequence, r, equal to an initial PRT sequence corresponding to the Golomb ruler, and interleave r with D-1 copies of r to construct the predetermined sequence of PRTs.

Aspect 18: The wireless communication apparatus of any of aspects 10 through 13 and 16, wherein the processor and the memory are configured to obtain the predetermined sequence of PRTs by being further configured to: determine a number D, corresponding to a ratio of a number of resource blocks (RBs) in the set of granted resources to 60 RBs, rounded up to a closest positive integer, obtain a set of marks of a Golomb ruler corresponding to 1/D multiplied by the number of RBs in the set of granted resources, construct a sequence, r, based on the set of marks of the Golomb ruler; and construct the predetermined sequence of PRTs (PRTseq(i)), wherein i={1, ..., N} and N is an integer corresponding to a total number of subcarriers in the set of granted resources, based on:

for D=1:

determine a square root, x, of the total number of subcarriers in the set of granted resources, rounded up to the closest positive integer, select a Golomb ruler of order x, where marks on the Golomb ruler represent peak reduction tone indices; and construct the PRTseq(i), as a sequence of zeros and ones of length equal to the total number of subcarriers, wherein PRTseq(i) is equal to 1 at the peak reduction tone indices and zero otherwise, for $D = 2$:

$$PRTseq(i) = \begin{cases} r\left(\frac{i}{2}\right) & \text{if } \mod(i, 2) = 0 \\ r\left(\frac{i-1}{2}\right) & \text{if } \mod(i, 2) = 1 \end{cases}, \text{ for } D = 3:$$

$$PRTseq(i) = \begin{cases} r\left(\frac{i}{3}\right) & \text{if } \mod(i, 3) = 0 \\ r\left(\frac{i-1}{3}\right) & \text{if } \mod(i, 3) = 1 \\ r\left(\frac{i-2}{3}\right) & \text{if } \mod(i, 3) = 2 \end{cases}, \text{ for } D = 4:$$

-continued $$PRTseq(i) = \begin{cases} r\left(\frac{i}{4}\right) & \text{if } \mod(i, 4) = 0 \\ r\left(\frac{i-1}{4}\right) & \text{if } \mod(i, 4) = 1 \\ r\left(\frac{i-2}{4}\right) & \text{if } \mod(i, 4) = 2 \\ r\left(\frac{i-3}{4}\right) & \text{if } \mod(i, 4) = 3 \end{cases}; \text{ and}$$

for $D = 5$:

$$PRTseq(i) = \begin{cases} r\left(\frac{i}{5}\right) & \text{if } \mod(i, 5) = 0 \\ r\left(\frac{i-1}{5}\right) & \text{if } \mod(i, 5) = 1 \\ r\left(\frac{i-2}{5}\right) & \text{if } \mod(i, 5) = 2 \\ r\left(\frac{i-3}{5}\right) & \text{if } \mod(i, 5) = 3 \\ r\left(\frac{i-4}{5}\right) & \text{if } \mod(i, 5) = 4 \end{cases}.$$

Aspect 19: A wireless communication apparatus in a wireless communication network, comprising: means for obtaining a predetermined sequence of peak reduction tones (PRTs) corresponding to a set of granted resources comprised of a plurality of tones, means for mapping a set of data to a first subset of the plurality of tones outside of the predetermined sequence of PRTs, means for mapping a set of PRTs to a second subset of the plurality of tones within the predetermined sequence of PRTs, means for canceling at least one peak of a time domain representation of the first subset of the plurality of tones using a time domain representation of the second subset of the plurality of tones, and means for transmitting a transmitted waveform comprising the first subset of the plurality of tones and the second subset of the plurality of tones.

Aspect 20: The wireless communication apparatus of aspect 19, wherein only the first subset of the plurality of tones is intended to be decoded.

Aspect 21: The wireless communication apparatus of aspect 19 or 20, wherein the means for obtaining the predetermined sequence of PRTs further comprise at least one of: means for obtaining the predetermined sequence of PRTs from a memory of the wireless communication apparatus, means for obtaining the predetermined sequence of PRTs from a table stored in the memory of the wireless communication apparatus, or means for constructing the predetermined sequence of PRTs from a plurality of PRT-related functions stored in the memory of the wireless communication apparatus.

22: The wireless communication apparatus of any of aspects 19 through 21, wherein the means for canceling at least one peak of the time domain representation of the first subset of the plurality of tones using the time domain representation of the second subset of the plurality of tones further comprises: means for shifting a phase and scaling an amplitude of the time domain representation of the second subset of the plurality of tones to align a target peak of the time domain representation of the first subset of the plurality of tones with a peak of the shifted and scaled time domain representation of the second subset of the plurality of tones, means for subtracting the shifted and scaled time domain representation of the second subset of the plurality of tones from the time domain representation of the first subset of the plurality of tones to obtain a time domain representation of the plurality of tones, and means for repeating the shifting, the scaling, and the subtracting until all peaks of the time domain representation of the plurality of tones are less than a predefined threshold.

Aspect 23: An article of manufacture for use by a wireless communication apparatus in a wireless communication network, the article comprising: a non-transitory computer-readable medium having stored therein instructions executable by one or more processors of the wireless communication apparatus to: obtain a predetermined sequence of peak reduction tones (PRTs) corresponding to a set of granted resources comprised of a plurality of tones, map a set of data to a first subset of the plurality of tones outside of the predetermined sequence of PRTs, map a set of PRTs to a second subset of the plurality of tones within the predetermined sequence of PRTs, cancel at least one peak of a time domain representation of the first subset of the plurality of tones using a time domain representation of the second subset of the plurality of tones, and transmit a transmitted waveform comprising the first subset of the plurality of tones and the second subset of the plurality of tones.

Aspect 24: The article of manufacture of aspect 23, wherein only the first subset of the plurality of tones is intended to be decoded.

Aspect 25: The article of manufacture of aspect 23 or 24, wherein the instructions executable by one or more processors of the wireless communication apparatus further comprises instructions to obtain the predetermined sequence of PRTs by at least one of: obtaining the predetermined sequence of PRTs from a memory of the wireless communication apparatus, obtaining the predetermined sequence of PRTs from a table stored in the memory of the wireless communication apparatus, or constructing the predetermined sequence of PRTs from a plurality of PRT-related functions stored in the memory of the wireless communication apparatus.

Aspect 26: The article of manufacture of any of aspects 23 through 25, wherein the instructions executable by one or more processors of the wireless communication apparatus to cancel the at least one peak of the time domain representation of the first subset of the plurality of tones using the time domain representation of the second subset of the plurality of tones, further comprises instructions to: shift a phase and scale an amplitude of the time domain representation of the second subset of the plurality of tones to align a target peak of the time domain representation of the first subset of the plurality of tones with a peak of the shifted and scaled time domain representation of the second subset of the plurality of tones, subtract the shifted and scaled time domain representation of the second subset of the plurality of tones from the time domain representation of the first subset of the plurality of tones to obtain a time domain representation of the plurality of tones, and repeat the shifting, the scaling, and the subtracting until all peaks of the time domain representation of the plurality of tones are less than a predefined threshold.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more."

Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover: A; B; and A and B. The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a wireless communication network, the method comprising, at a wireless communication apparatus:
   obtaining a predetermined sequence of peak reduction tones (PRTs) corresponding to a set of granted resources comprised of a plurality of tones;
   mapping a set of data to a first subset of the plurality of tones outside of the predetermined sequence of PRTs;
   mapping a set of PRTs to a second subset of the plurality of tones within the predetermined sequence of PRTs;
   canceling at least one peak of a time domain representation of the first subset of the plurality of tones using a time domain representation of the second subset of the plurality of tones;
   transmitting a transmitted waveform comprising the first subset of the plurality of tones and the second subset of the plurality of tones; and
   obtaining the predetermined sequence of PRTs by obtaining a Golomb ruler having an order that is a function of a total number of tones in the set of granted resources.

2. The method of claim 1, wherein only the first subset of the plurality of tones is intended to be decoded.

3. The method of claim 1, wherein the wireless communication apparatus is pre-configured with the predetermined sequence of PRTs corresponding to the set of granted resources.

4. The method of claim 1, wherein the set of granted resources comprise at least one of: a non-contiguous set of resource blocks, or a non-contiguous set of subcarriers.

5. The method of claim 1, further comprising, obtaining the predetermined sequence of PRTs by:
   determining a number D, corresponding to a ratio of a number of resource blocks (RBs) in the set of granted resources to 60 RBs, rounded up to a closest positive integer;
   obtaining a set of marks of the Golomb ruler having an index corresponding to 1/D multiplied by the number of RBs in the set of granted resources;
   constructing a sequence, r, based on the set of marks of the Golomb ruler; and
   constructing the predetermined sequence of PRTs (PRTseq(i)), wherein i={1, . . . , N} and N is an integer corresponding to a total number of subcarriers in the set of granted resources, based on:

for $D = 1$:

determining a square root, x, of the total number of subcarriers in the set of granted resources, rounded up to the closest positive integer;
selecting the Golomb ruler of order x, where marks on the Golomb ruler represent peak reduction tone indices; and
constructing the PRTseq(i) as a sequence of zeros and ones of length equal to the total number of subcarriers, wherein PRTseq(i) is equal to 1 at the peak reduction tone indices and zero otherwise;

for $D = 2$:

$$PRTseq(i) = \begin{cases} r\left(\frac{i}{2}\right) & \text{if } \mod(i, 2) = 0 \\ r\left(\frac{i-1}{2}\right) & \text{if } \mod(i, 2) = 1 \end{cases};$$

for $D = 3$:

$$PRTseq(i) = \begin{cases} r\left(\frac{i}{3}\right) & \text{if } \mod(i, 3) = 0 \\ r\left(\frac{i-1}{3}\right) & \text{if } \mod(i, 3) = 1 \\ r\left(\frac{i-2}{3}\right) & \text{if } \mod(i, 3) = 2 \end{cases};$$

for $D = 4$:

$$PRTseq(i) = \begin{cases} r\left(\frac{i}{4}\right) & \text{if } \mod(i, 4) = 0 \\ r\left(\frac{i-1}{4}\right) & \text{if } \mod(i, 4) = 1 \\ r\left(\frac{i-2}{4}\right) & \text{if } \mod(i, 4) = 2 \\ r\left(\frac{i-3}{4}\right) & \text{if } \mod(i, 4) = 3 \end{cases}; \text{ and}$$

for $D = 5$:

$$PRTseq(i) = \begin{cases} r\left(\frac{i}{5}\right) & \text{if } \mod(i, 5) = 0 \\ r\left(\frac{i-1}{5}\right) & \text{if } \mod(i, 5) = 1 \\ r\left(\frac{i-2}{5}\right) & \text{if } \mod(i, 5) = 2 \\ r\left(\frac{i-3}{5}\right) & \text{if } \mod(i, 5) = 3 \\ r\left(\frac{i-4}{5}\right) & \text{if } \mod(i, 5) = 4 \end{cases}.$$

6. The method of claim 1, further comprising obtaining the predetermined sequence of PRTs by at least one of:
   obtaining the predetermined sequence of PRTs from a memory of the wireless communication apparatus,
   obtaining the predetermined sequence of PRTs from a table stored in the memory of the wireless communication apparatus, or
   constructing the predetermined sequence of PRTs from a plurality of PRT-related functions stored in the memory of the wireless communication apparatus.

7. The method of claim 1, wherein the canceling the at least one peak of the time domain representation of the first subset of the plurality of tones using the time domain representation of the second subset of the plurality of tones, further comprises:

shifting a phase and scaling an amplitude of the time domain representation of the second subset of the plurality of tones to align a target peak of the time domain representation of the first subset of the plurality of tones with a peak of the shifted and scaled time domain representation of the second subset of the plurality of tones;

subtracting the shifted and scaled time domain representation of the second subset of the plurality of tones from the time domain representation of the first subset of the plurality of tones to obtain a time domain representation of the plurality of tones; and repeating the shifting, the scaling, and the subtracting until all peaks of the time domain representation of the plurality of tones are less than a predefined threshold.

8. The method of claim 1, further comprising, obtaining the predetermined sequence of PRTs by:

determining a number D, corresponding to a ratio of a number of resource blocks (RBs) in the set of granted resources to 60 RBs, rounded up to a closest positive integer;

obtaining a set of marks of the Golomb ruler corresponding to 1/D multiplied by the number of RBs in the set of granted resources;

constructing an initial sequence, r, equal to an initial PRT sequence corresponding to the Golomb ruler; and interleaving r with D-1 copies of r to construct the predetermined sequence of PRTs.

9. A wireless communication apparatus in a wireless communication network, comprising:

a wireless transceiver;

a memory; and a processor coupled to the wireless transceiver and the memory, wherein the processor and the memory are configured to:

obtain a predetermined sequence of peak reduction tones (PRTs) corresponding to a set of granted resources comprised of a plurality of tones;

map a set of data to a first subset of the plurality of tones outside of the predetermined sequence of PRTs;

map a set of PRTs to a second subset of the plurality of tones within the predetermined sequence of PRTs;

cancel at least one peak of a time domain representation of the first subset of the plurality of tones using a time domain representation of the second subset of the plurality of tones;

transmit a transmitted waveform comprising the first subset of the plurality of tones and the second subset of the plurality of tones; and obtain the predetermined sequence of PRTs by obtaining a Golomb ruler having an order that is a function of a total number of tones in the set of granted resources.

10. The wireless communication apparatus of claim 9, wherein the processor and the memory are configured to obtain the predetermined sequence of PRTs by being further configured to:

determine a number D, corresponding to a ratio of a number of resource blocks (RBs) in the set of granted resources to 60 RBs, rounded up to a closest positive integer;

obtain a set of marks of the Golomb ruler having an index corresponding to 1/D multiplied by the number of RBs in the set of granted resources;

construct an initial sequence, r, equal to an initial PRT sequence corresponding to the Golomb ruler; and interleave r with D-1 copies of r to construct the predetermined sequence of PRTs.

11. The wireless communication apparatus of claim 9, wherein only the first subset of the plurality of tones is intended to be decoded.

12. The wireless communication apparatus of claim 9, wherein the wireless communication apparatus is pre-configured with the predetermined sequence of PRTs associated with the set of granted resources.

13. The wireless communication apparatus of claim 9, wherein the set of granted resources comprises at least one of: a non-contiguous set of resource blocks, or a non-contiguous set of subcarriers.

14. The wireless communication apparatus of claim 9, wherein the processor and the memory are configured to obtain the predetermined sequence of PRTs by being further configured to:

determine a number D, corresponding to a ratio of a number of resource blocks (RBs) in the set of granted resources to 60 RBs, rounded up to a closest positive integer;

obtain a set of marks of the Golomb ruler corresponding to 1/D multiplied by the number of RBs in the set of granted resources;

construct a sequence, r, based on the set of marks of the Golomb ruler; and construct the predetermined sequence of PRTs (PRTseq(i)), wherein i=$\{1, \ldots, N\}$ and N is an integer corresponding to a total number of subcarriers in the set of granted resources, based on:

for $D = 1$:

determine a square root, x, of the total number of subcarriers in the set of granted resources, rounded up to the closest positive integer;

select the Golomb ruler of order x, where marks on the Golomb ruler represent peak reduction tone indices; and construct the PRTseq(i), as a sequence of zeros and ones of length equal to the total number of subcarriers, wherein PRTseq(i) is equal to 1 at the peak reduction tone indices and zero otherwise;

for $D = 2$:

$$PRTseq(i) = \begin{cases} r\left(\frac{i}{2}\right) & \text{if mod}(i, 2) = 0 \\ r\left(\frac{i-1}{2}\right) & \text{if mod}(i, 2) = 1 \end{cases};$$

for $D = 3$:

$$PRTseq(i) = \begin{cases} r\left(\frac{i}{3}\right) & \text{if mod}(i, 3) = 0 \\ r\left(\frac{i-1}{3}\right) & \text{if mod}(i, 3) = 1 \\ r\left(\frac{i-2}{3}\right) & \text{if mod}(i, 3) = 2 \end{cases};$$

-continued for $D = 4$:

$$PRTseq(i) = \begin{cases} r\left(\frac{i}{4}\right) & \text{if } \mod(i, 4) = 0 \\ r\left(\frac{i-1}{4}\right) & \text{if } \mod(i, 4) = 1 \\ r\left(\frac{i-2}{4}\right) & \text{if } \mod(i, 4) = 2 \\ r\left(\frac{i-3}{4}\right) & \text{if } \mod(i, 4) = 3 \end{cases} ; \text{ and}$$

for $D = 5$:

$$PRTseq(i) = \begin{cases} r\left(\frac{i}{5}\right) & \text{if } \mod(i, 5) = 0 \\ r\left(\frac{i-1}{5}\right) & \text{if } \mod(i, 5) = 1 \\ r\left(\frac{i-2}{5}\right) & \text{if } \mod(i, 5) = 2 \\ r\left(\frac{i-3}{5}\right) & \text{if } \mod(i, 5) = 3 \\ r\left(\frac{i-4}{5}\right) & \text{if } \mod(i, 5) = 4 \end{cases}$$

15. The wireless communication apparatus of claim 9, wherein the processor and the memory are further configured to obtain the predetermined sequence of PRTs by being further configured to at least one of:
  obtain the predetermined sequence of PRTs from a memory of the wireless communication apparatus,
  obtain the predetermined sequence of PRTs from a table stored in the memory of the wireless communication apparatus, or
  construct the predetermined sequence of PRTs from a plurality of PRT-related functions stored in the memory of the wireless communication apparatus.

16. The wireless communication apparatus of claim 9, wherein the processor and the memory are configured to cancel the at least one peak of the time domain representation of the first subset of the plurality of tones using the time domain representation of the second subset of the plurality of tones by being further configured to:
  shift a phase and scale an amplitude of the time domain representation of the second subset of the plurality of tones to align a target peak of the time domain representation of the first subset of the plurality of tones with a peak of the shifted and scaled time domain representation of the second subset of the plurality of tones;
  subtract the shifted and scaled time domain representation of the second subset of the plurality of tones from the time domain representation of the first subset of the plurality of tones to obtain a time domain representation of the plurality of tones; and
  repeat the shifting, the scaling, and the subtracting until all peaks of the time domain representation of the plurality of tones are less than a predefined threshold.

17. A wireless communication apparatus in a wireless communication network, comprising:
  means for obtaining a predetermined sequence of peak reduction tones (PRTs) corresponding to a set of granted resources comprised of a plurality of tones;
  means for mapping a set of data to a first subset of the plurality of tones outside of the predetermined sequence of PRTs;
  means for mapping a set of PRTs to a second subset of the plurality of tones within the predetermined sequence of PRTs;
  means for canceling at least one peak of a time domain representation of the first subset of the plurality of tones using a time domain representation of the second subset of the plurality of tones;
  means for transmitting a transmitted waveform comprising the first subset of the plurality of tones and the second subset of the plurality of tones; and
  means for obtaining the predetermined sequence of PRTs by means for obtaining a Golomb ruler having an order that is a function of a total number of tones in the set of granted resources.

18. The wireless communication apparatus of claim 17, wherein the means for canceling at least one peak of the time domain representation of the first subset of the plurality of tones using the time domain representation of the second subset of the plurality of tones further comprises:
  means for shifting a phase and scaling an amplitude of the time domain representation of the second subset of the plurality of tones to align a target peak of the time domain representation of the first subset of the plurality of tones with a peak of the shifted and scaled time domain representation of the second subset of the plurality of tones;
  means for subtracting the shifted and scaled time domain representation of the second subset of the plurality of tones from the time domain representation of the first subset of the plurality of tones to obtain a time domain representation of the plurality of tones; and
  means for repeating the shifting, the scaling, and the subtracting until all peaks of the time domain representation of the plurality of tones are less than a predefined threshold.

19. The wireless communication apparatus of claim 17, wherein the means for obtaining the predetermined sequence of PRTs comprises:
  means for determining a number D, corresponding to a ratio of a number of resource blocks (RBs) in the set of granted resources to 60 RBs, rounded up to a closest positive integer;
  means for obtaining a set of marks of the Golomb ruler corresponding to 1/D multiplied by the number of RBs in the set of granted resources;
  means for constructing an initial sequence, r, equal to an initial PRT sequence corresponding to the Golomb ruler; and
  means for interleaving r with D-1 copies of r to construct the predetermined sequence of PRTs.

20. The wireless communication apparatus of claim 17, wherein only the first subset of the plurality of tones is intended to be decoded.

21. The wireless communication apparatus of claim 17, wherein the means for obtaining the predetermined sequence of PRTs further comprise at least one of:
  means for obtaining the predetermined sequence of PRTs from a memory of the wireless communication apparatus,
  means for obtaining the predetermined sequence of PRTs from a table stored in the memory of the wireless communication apparatus, or
  means for constructing the predetermined sequence of PRTs from a plurality of PRT-related functions stored in the memory of the wireless communication apparatus.

22. An article of manufacture for use by a wireless communication apparatus in a wireless communication network, the article comprising:
- a non-transitory computer-readable medium having stored therein instructions executable by one or more processors of the wireless communication apparatus to:
  - obtain a predetermined sequence of peak reduction tones (PRTs) corresponding to a set of granted resources comprised of a plurality of tones;
  - map a set of data to a first subset of the plurality of tones outside of the predetermined sequence of PRTs;
  - map a set of PRTs to a second subset of the plurality of tones within the predetermined sequence of PRTs;
  - cancel at least one peak of a time domain representation of the first subset of the plurality of tones using a time domain representation of the second subset of the plurality of tones;
  - transmit a transmitted waveform comprising the first subset of the plurality of tones and the second subset of the plurality of tones; and
  - obtain the predetermined sequence of PRTs by obtaining a Golomb ruler having an order that is a function of a total number of tones in the set of granted resources.

23. The article of manufacture of claim 22, wherein the instructions to obtain the predetermined sequence of PRTs comprise instructions to:
- determine a number D, corresponding to a ratio of a number of resource blocks (RBs) in the set of granted resources to 60 RBs, rounded up to a closest positive integer;
- obtain a set of marks of the Golomb ruler corresponding to 1/D multiplied by the number of RBs in the set of granted resources;
- construct an initial sequence, r, equal to an initial PRT sequence corresponding to the Golomb ruler; and
- interleave r with D-1 copies of r to construct the predetermined sequence of PRTs.

24. The article of manufacture of claim 22, wherein only the first subset of the plurality of tones is intended to be decoded.

25. The article of manufacture of claim 22, wherein the instructions executable by one or more processors of the wireless communication apparatus further comprises instructions to obtain the predetermined sequence of PRTs by at least one of:
- obtaining the predetermined sequence of PRTs from a memory of the wireless communication apparatus,
- obtaining the predetermined sequence of PRTs from a table stored in the memory of the wireless communication apparatus, or
- constructing the predetermined sequence of PRTs from a plurality of PRT-related functions stored in the memory of the wireless communication apparatus.

26. The article of manufacture of claim 22, wherein the instructions executable by one or more processors of the wireless communication apparatus to cancel the at least one peak of the time domain representation of the first subset of the plurality of tones using the time domain representation of the second subset of the plurality of tones, further comprises instructions to:
- shift a phase and scale an amplitude of the time domain representation of the second subset of the plurality of tones to align a target peak of the time domain representation of the first subset of the plurality of tones with a peak of the shifted and scaled time domain representation of the second subset of the plurality of tones;
- subtract the shifted and scaled time domain representation of the second subset of the plurality of tones from the time domain representation of the first subset of the plurality of tones to obtain a time domain representation of the plurality of tones; and
- repeat the shifting, the scaling, and the subtracting until all peaks of the time domain representation of the plurality of tones are less than a predefined threshold.

* * * * *